(12) United States Patent
Spurgeon

(10) Patent No.: US 8,568,202 B2
(45) Date of Patent: *Oct. 29, 2013

(54) STONE ARTICLE WITH PATTERNED TRIM

(75) Inventor: Daniel A. Spurgeon, Raytown, MO (US)

(73) Assignee: Daniel A. Spurgeon, Raytown, MO (US)

( * ) Notice: Subject to any disclaimer, the term of this patent is extended or adjusted under 35 U.S.C. 154(b) by 1051 days.

This patent is subject to a terminal disclaimer.

(21) Appl. No.: 12/540,221

(22) Filed: Aug. 12, 2009

(65) Prior Publication Data

US 2011/0036044 A1   Feb. 17, 2011

(51) Int. Cl.
*B24B 1/00*   (2006.01)

(52) U.S. Cl.
USPC .......................................... 451/41; 125/13.01

(58) Field of Classification Search
USPC .......................................... 451/41; 125/13.01
See application file for complete search history.

(56) References Cited

U.S. PATENT DOCUMENTS

| | | | |
|---|---|---|---|
| 1,396,554 A | 11/1921 | Breese | |
| 1,485,810 A | 3/1924 | Parker, Jr. et al. | |
| 2,037,294 A | 4/1936 | Williamson | |
| 3,077,012 A | 2/1963 | Speraw | |
| 3,511,738 A | 5/1970 | McGuire | |
| 3,740,513 A | 6/1973 | Peters, Jr. et al. | |
| 3,842,488 A | 10/1974 | Mitchell | |
| 3,878,030 A | 4/1975 | Cook | |
| 3,950,202 A | 4/1976 | Hodges | |
| 4,139,882 A | 2/1979 | Schneider | |
| 4,253,559 A | 3/1981 | Myers et al. | |
| 4,333,288 A | 6/1982 | Coombs | |
| 4,364,672 A | 12/1982 | Shibuya et al. | |
| 4,640,850 A | 2/1987 | Marocco | |
| 4,640,947 A | 2/1987 | Berg et al. | |
| 4,814,220 A | 3/1989 | Brathwaite | |
| 4,822,661 A | 4/1989 | Battaglia | |
| 4,843,524 A | 6/1989 | Krent et al. | |
| 4,931,331 A | 6/1990 | Owens | |
| 4,956,030 A | 9/1990 | Baskin | |
| 5,075,254 A | 12/1991 | Robinson et al. | |
| 5,085,027 A | 2/1992 | McClung et al. | |
| 5,157,891 A | 10/1992 | Nelson | |
| 5,208,086 A | 5/1993 | Owens | |
| 5,253,932 A | 10/1993 | Nesovic | |
| 5,273,620 A | 12/1993 | Lamberti | |

(Continued)

FOREIGN PATENT DOCUMENTS

DE   3310281 A1   10/1984

OTHER PUBLICATIONS

Benissimo Systems, "Benissimo Systems," from website www.benissimosystems.com (printed Apr. 17, 2009).

(Continued)

*Primary Examiner* — Maurina Rachuba
(74) *Attorney, Agent, or Firm* — Hovey Williams LLP

(57) ABSTRACT

An inlaid stone composite broadly includes a stone body and a stone inlay assembly secured to the stone body. The inlaid stone composite is constructed by forming a groove in the stone body, with the groove extending inwardly from an edge surface of the stone body, securing a plurality of stone segments relative to one another exteriorly of the groove to provide the stone inlay assembly, and securing the stone inlay assembly within the groove to form an inlaid margin.

27 Claims, 13 Drawing Sheets

(56) References Cited

U.S. PATENT DOCUMENTS

| | | | |
|---|---|---|---|
| 5,286,290 A | 2/1994 | Risley |
| 5,310,435 A | 5/1994 | Kelly |
| 5,330,262 A | 7/1994 | Peters |
| 5,364,672 A | 11/1994 | Schultze-Kraft |
| 5,452,666 A | 9/1995 | Peters |
| 5,469,685 A | 11/1995 | Nelson |
| 5,476,895 A | 12/1995 | Ghahary |
| 5,511,899 A | 4/1996 | Pavelek, II |
| 5,536,345 A | 7/1996 | Lingart |
| 5,613,342 A | 3/1997 | Nelson |
| 5,640,947 A | 6/1997 | Shute |
| 5,670,007 A | 9/1997 | Toncelli |
| 5,697,413 A | 12/1997 | Fuller |
| 5,709,453 A | 1/1998 | Krent et al. |
| 5,787,667 A | 8/1998 | Sheahan et al. |
| 5,789,032 A | 8/1998 | Le Cong et al. |
| 5,792,524 A | 8/1998 | Lingart et al. |
| 5,797,238 A | 8/1998 | Berntsson et al. |
| 6,006,735 A | 12/1999 | Schlough et al. |
| 6,179,434 B1 | 1/2001 | Saraiji |
| 6,183,585 B1 | 2/2001 | Kelley |
| 6,205,727 B1 | 3/2001 | Toncelli |
| 6,258,190 B1 | 7/2001 | Sciarrino et al. |
| 6,286,577 B1 | 9/2001 | Douglas et al. |
| 6,378,257 B1 | 4/2002 | Guerri |
| 6,413,337 B2 | 7/2002 | Sciarrino et al. |
| 6,517,897 B1 | 2/2003 | Bordener |
| 6,547,419 B1 | 4/2003 | Brackman |
| 6,772,748 B2 | 8/2004 | Cleary |
| 6,792,934 B2 | 9/2004 | Benyovits |
| 6,886,304 B1 | 5/2005 | Godi et al. |
| 6,945,006 B2 | 9/2005 | Stoffer |
| 6,958,367 B2 | 10/2005 | Milic et al. |
| 7,021,786 B1 | 4/2006 | Sandor, Sr. |
| 7,090,380 B2 | 8/2006 | Gerfers, III |
| 7,094,136 B2 | 8/2006 | Nomoto et al. |
| 7,166,369 B2 | 1/2007 | Sturley |
| 7,182,080 B1 | 2/2007 | O'Neal |
| 7,221,104 B2 | 5/2007 | Lys et al. |
| 7,229,203 B2 | 6/2007 | Lath |
| 7,374,472 B2 | 5/2008 | Zheng |
| 7,582,175 B2 * | 9/2009 | Trejo-Rincon ................ 156/71 |
| 7,909,028 B2 * | 3/2011 | Spurgeon ................ 125/13.01 |
| 8,298,044 B2 * | 10/2012 | Spurgeon ................ 451/41 |
| 2002/0006313 A1 | 1/2002 | Pas |
| 2002/0124525 A1 | 9/2002 | Stoffer |
| 2003/0019571 A1 * | 1/2003 | Zanzuri ................ 156/256 |
| 2003/0047176 A1 | 3/2003 | Benyovits |
| 2003/0070670 A1 | 4/2003 | Cleary |
| 2003/0070671 A1 | 4/2003 | Cleary |
| 2004/0150306 A1 | 8/2004 | Steedly |
| 2004/0213946 A1 | 10/2004 | Miller |
| 2004/0228144 A1 | 11/2004 | Squicciarini |
| 2005/0006379 A1 | 1/2005 | Sullivan |
| 2005/0035693 A1 | 2/2005 | Reamer |
| 2005/0073224 A1 | 4/2005 | Livingston et al. |
| 2005/0116667 A1 * | 6/2005 | Mueller et al. ................ 315/312 |
| 2006/0154015 A1 | 7/2006 | Miller et al. |
| 2006/0179791 A1 | 8/2006 | Shaw |
| 2006/0198128 A1 | 9/2006 | Piepgras et al. |
| 2006/0217044 A1 | 9/2006 | Volponi |
| 2007/0003791 A1 | 1/2007 | Rochette |

OTHER PUBLICATIONS

Alibaba.com Corp, "Jiangxi Hongtai Industry Group Co., Inc.," from website www.hongtai.en.alibaba.com (printed Mar. 28, 2007).

Marblemaster, "Microthin Granite Panels," from website www.marblemaster.com (printed Mar. 28, 2007).

Amana Tool, "Vertical Raised Panel," from website www.amanatool.com (printed Mar. 31, 2007).

Lyman Associates, Inc., "Home Page," from website www.lymanassociates.com (printed Mar. 31, 2007).

Auto 'V' Grooving, Inc. "Auto 'V' Grooving Inc.," from website www.vgrooving.com (printed Apr. 1, 2007).

Auto 'V' Grooving Inc., "ST-SS-2-FT Automatic Lineal "V" Groover for Natural and Engineered Stone Plus Solid Surface," from web site www.vgrooving.com (printed Apr. 1, 2007).

Joe Dowd, Countertop Innovation Takes Firm to New Level, Kitchen and Bath Design News; Jan. 2007; at 38, 40.

SEClay, About Precision Stone Inlays at http://www.seclay.com/aboutinlays/aboutinlays.htm (dated Oct. 2, 2007).

SEClay, Cabinetry at http://www.seclay.com/cabinetry/cab.htm (dated Oct. 2, 2007).

SEClay, Inlay Catalogue at http://www.seclay.com/catalog/cat (dated Oct. 2, 2007).

Prussiani Engineering, General Catalog at 24 (dated Oct. 2007).

Granquartz, Stone Tools and Equipment Catalog vol. 2 at 44 (dated 2007).

Office Action Jul. 2, 2009 from U.S. Appl. No. 11/953,168, filed Dec. 10, 2007; Inventor: Daniel A. Spurgeon.

Office Action Mar. 19, 2010 from U.S. Appl. No. 11/953,168, filed Dec. 10, 2007; Inventor: Daniel A. Spurgeon.

Office Action Jun. 1, 2010 from U.S. Appl. No. 11/953,168, filed Dec. 10, 2007; Inventor: Daniel A. Spurgeon.

Amendment from U.S. Appl. No. 11/953,168 in Response to Office Action dated Jul. 2, 2009 (Amendment filed Jan. 4, 2010).

* cited by examiner

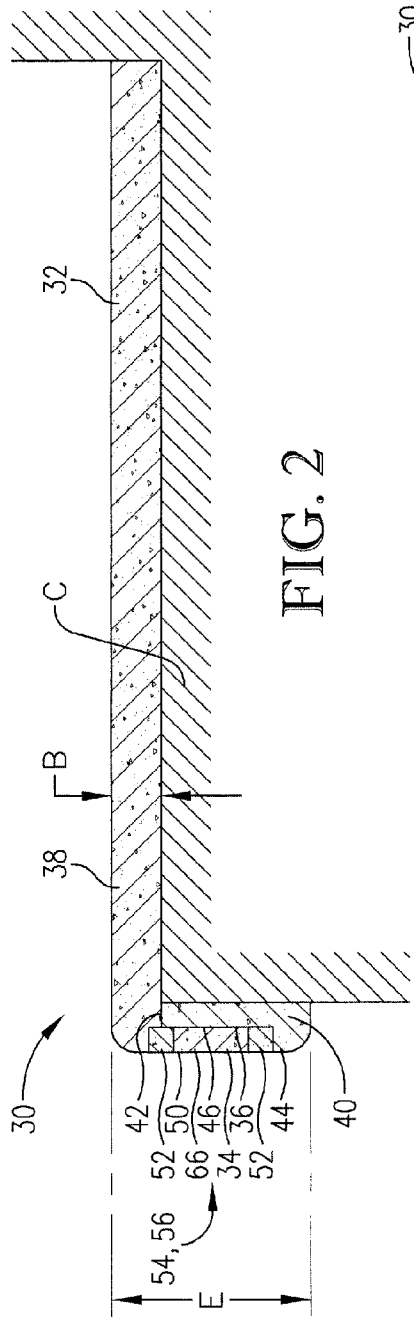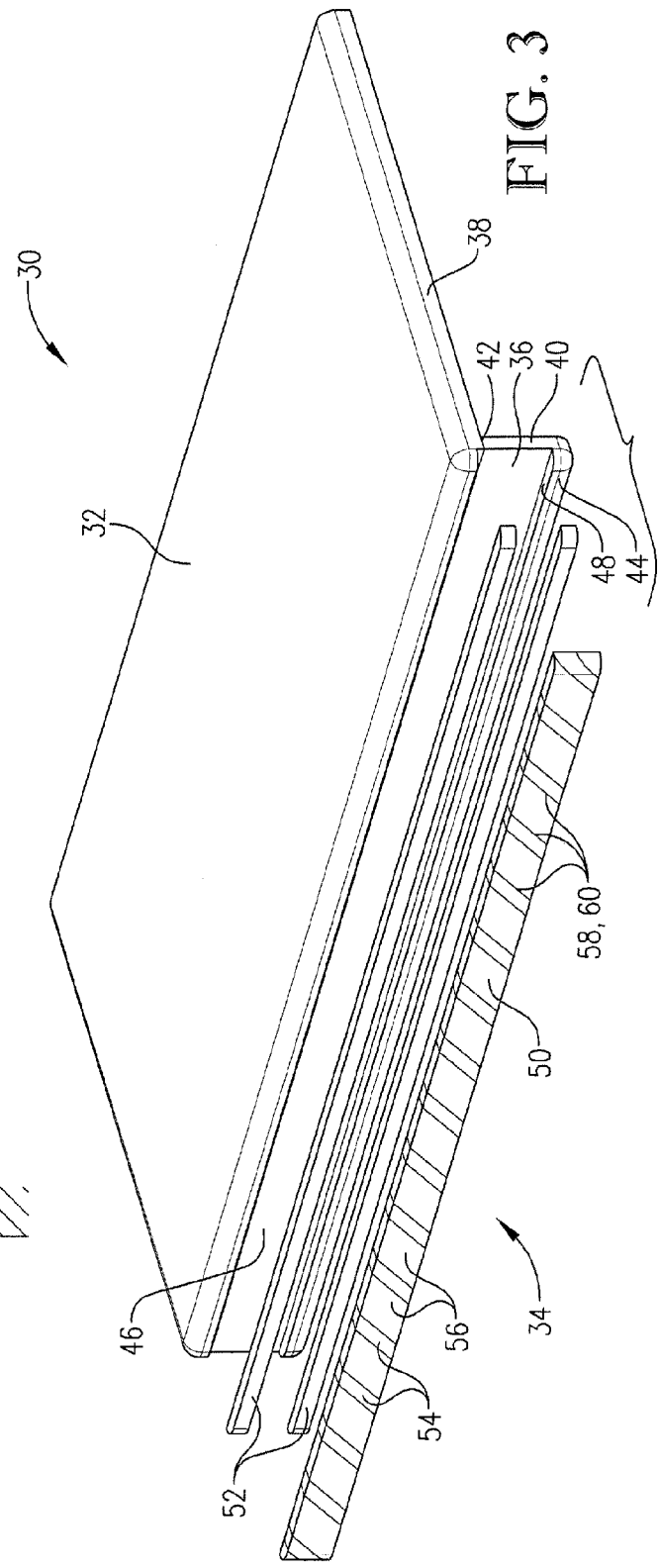

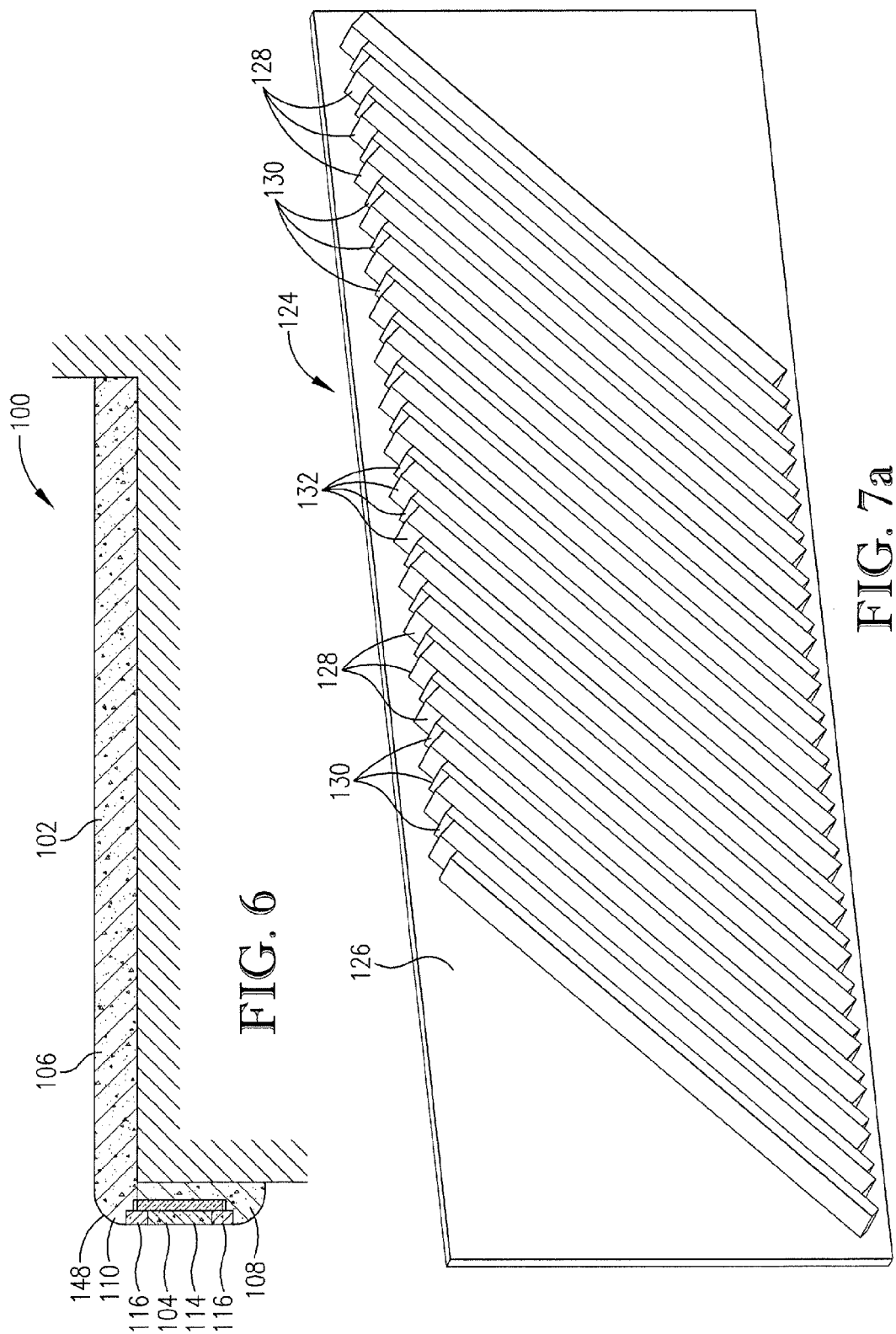

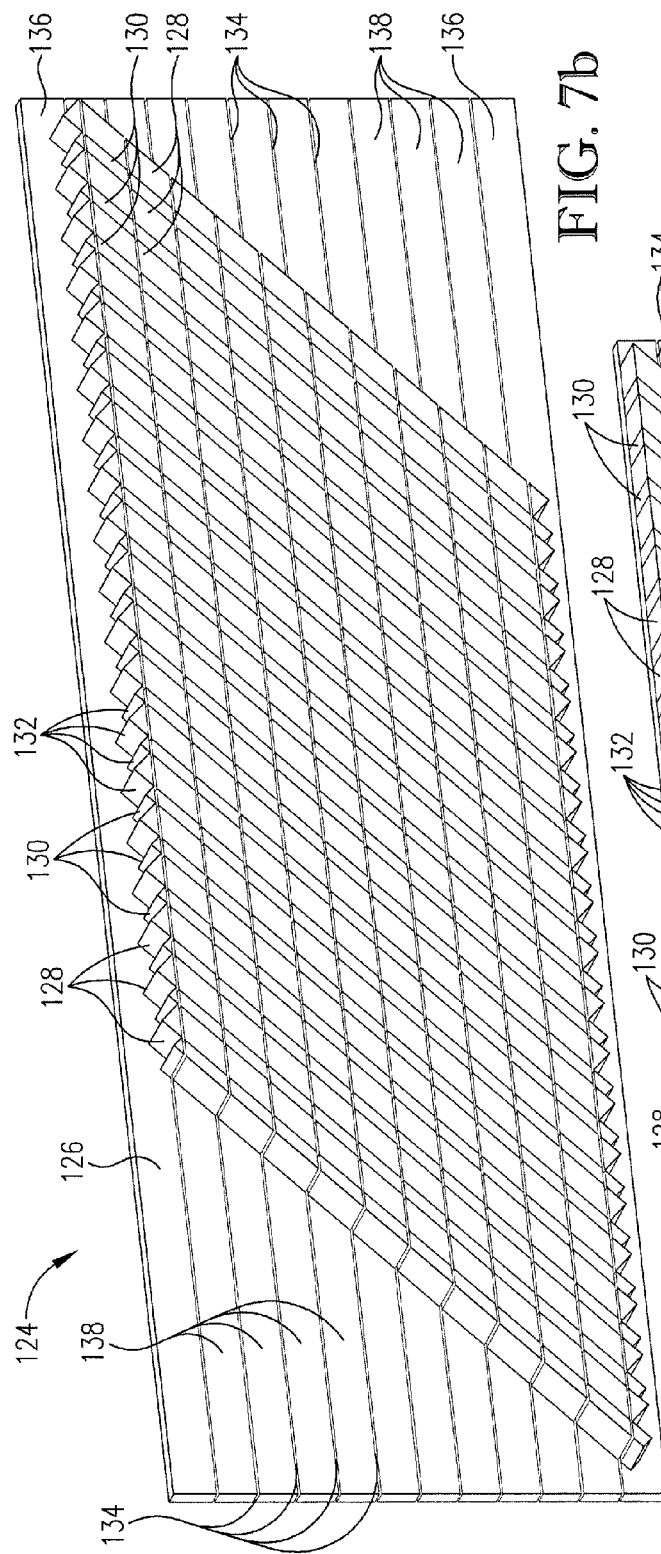
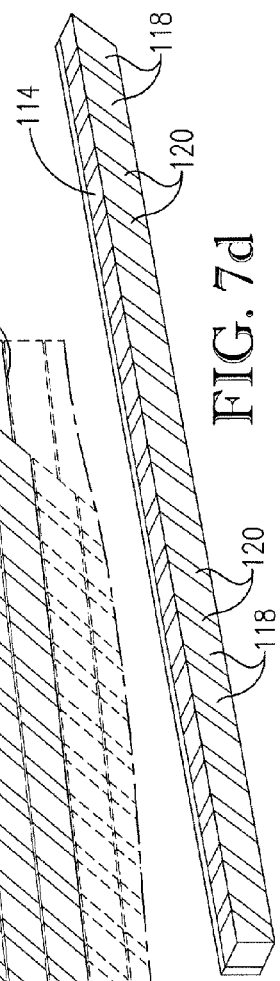
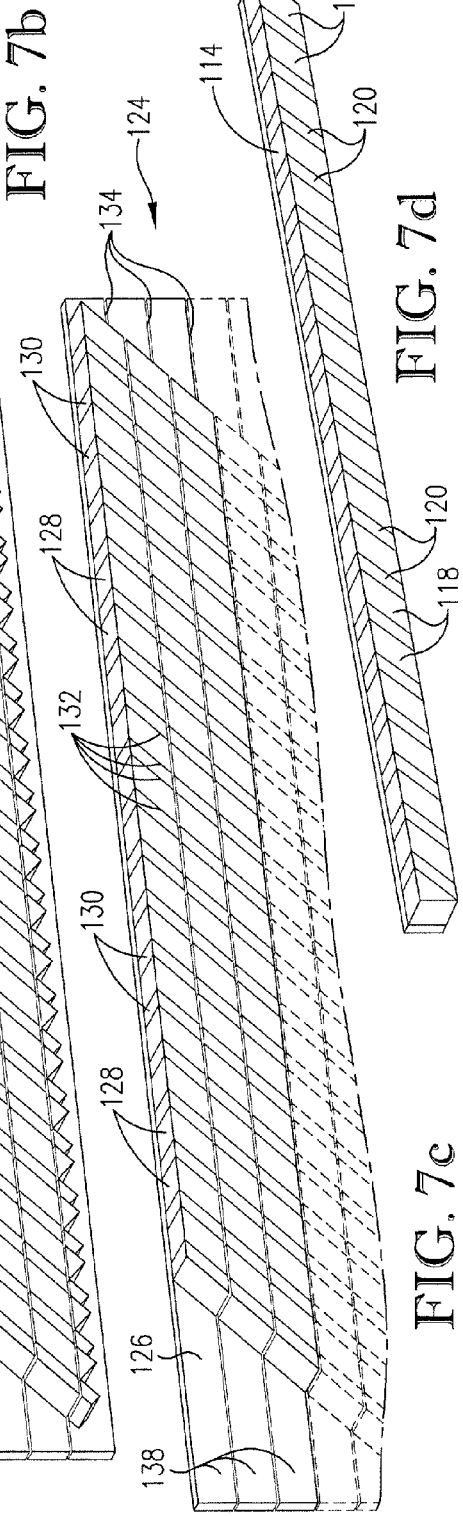
FIG. 7b
FIG. 7c
FIG. 7d

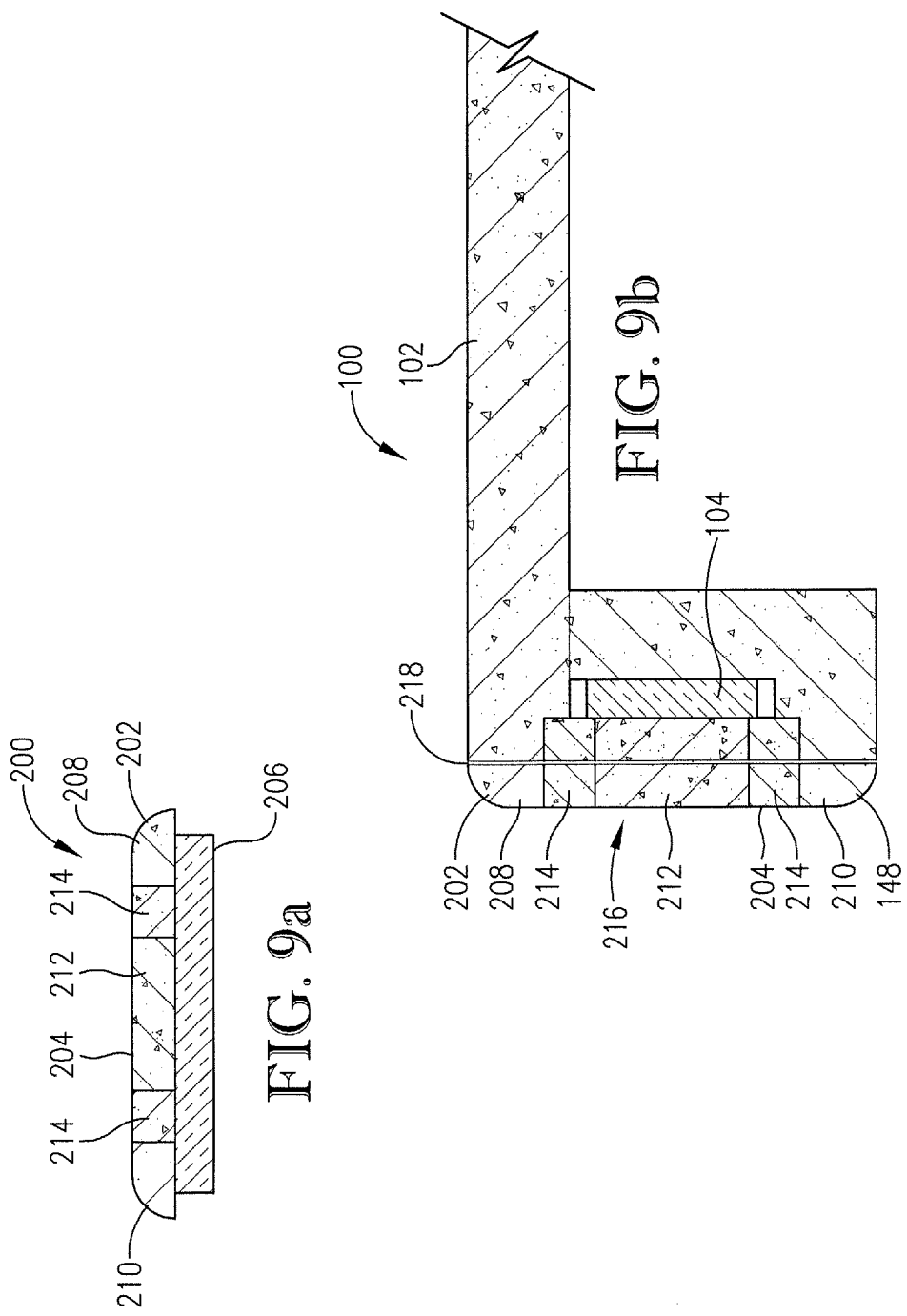

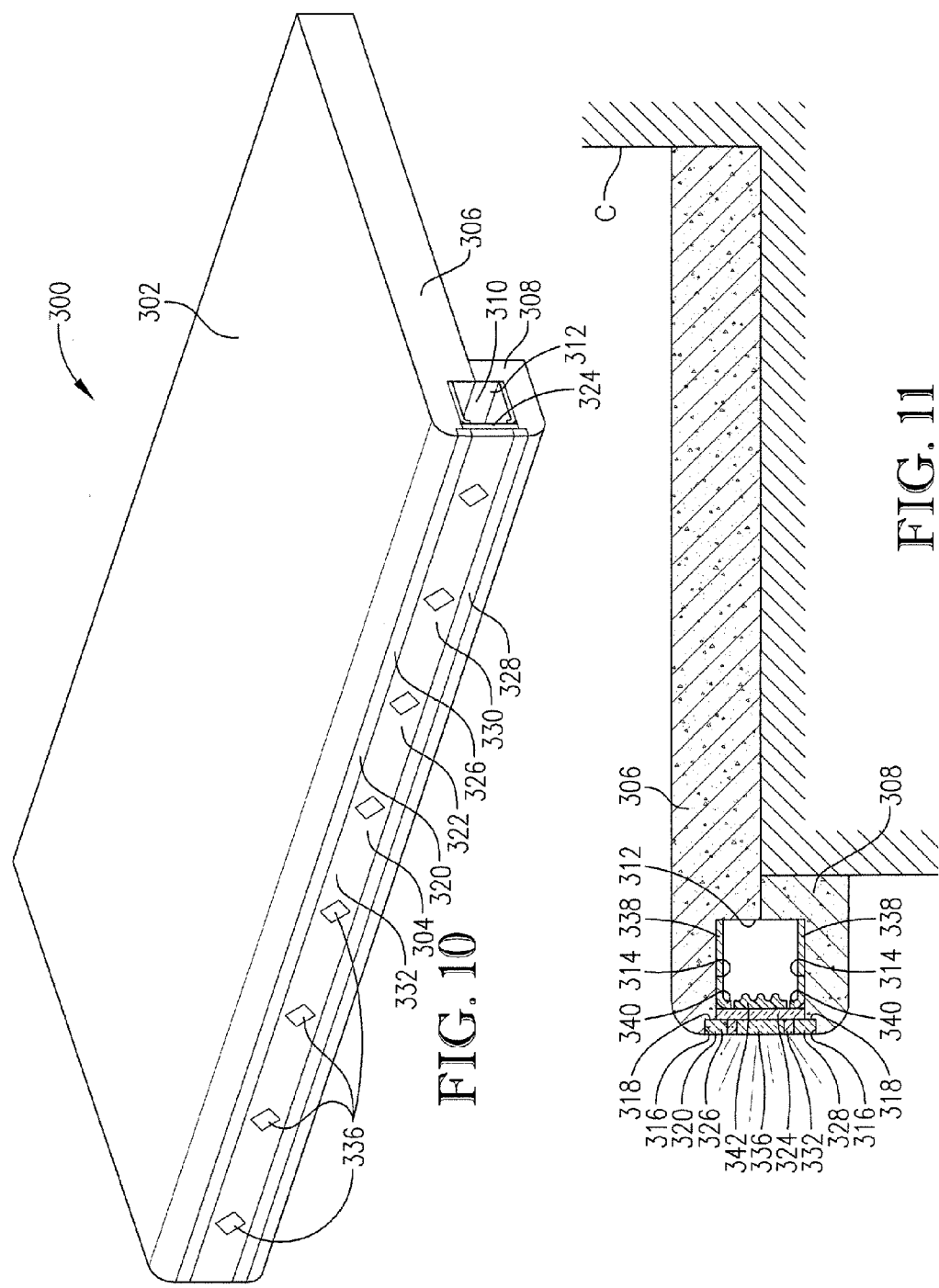

STONE ARTICLE WITH PATTERNED TRIM

BACKGROUND

1. Field

The present invention relates generally to man-made stone structures. More specifically, embodiments of the present invention concern an inlaid stone composite with stone layers secured to one another.

2. Discussion of Prior Art

The use of various stone materials, such as granite, marble, or quartz, for residential or commercial installations, e.g., for kitchen countertops, is well known in the art. Natural granite is desirable for such applications because of several attributes, e.g., its resistance to scratching, resistance to damage from extreme heat, and its luxurious appearance. Furthermore, it is also known in the art to use engineered stone type materials, which include finely ground stone particles or dust, for such applications. Whether natural or man-made, stone is commonly machined and polished by powered machines to provide the stone with a polished surface while also providing a desired edge shape.

Prior art stone building products and associated manufacturing methods are problematic and suffer from various undesirable limitations. For instance, prior art methods are deficient when it comes to combining stone layers to present an attractive stone composite panel. In particular, prior art machining methods cause excessive and undesirable chipping of stone, particularly when very thin stone layers are being machined. Furthermore, prior art stone constructions and machining methods are labor-intensive and expensive.

SUMMARY

Embodiments of the present invention provide an inlaid stone composite that does not suffer from the problems and limitations of the prior art stone products and methods set forth above.

A first aspect of the present invention concerns a method of manufacturing an inlaid stone composite having a plurality of stone layers. The method broadly includes the steps of forming a longitudinally extending groove in a first one of the stone layers, with the groove extending inwardly from an edge surface of the first stone layer to define a groove base; securing a plurality of stone segments relative to one another exteriorly of the groove to provide a second one of the stone layers; and securing the second stone layer within the groove, with the first and second stone layers cooperatively forming an inlaid margin.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 2 is a side cross section of the inlaid stone composite shown in FIG. 1, showing a stone body, a linear inlay assembly, and inlaid border sections, with the inlaid stone composite presenting a finished edge surface;

FIG. 3 is an exploded perspective of the inlaid stone composite shown in FIGS. 1 and 2;

Figure 8A:
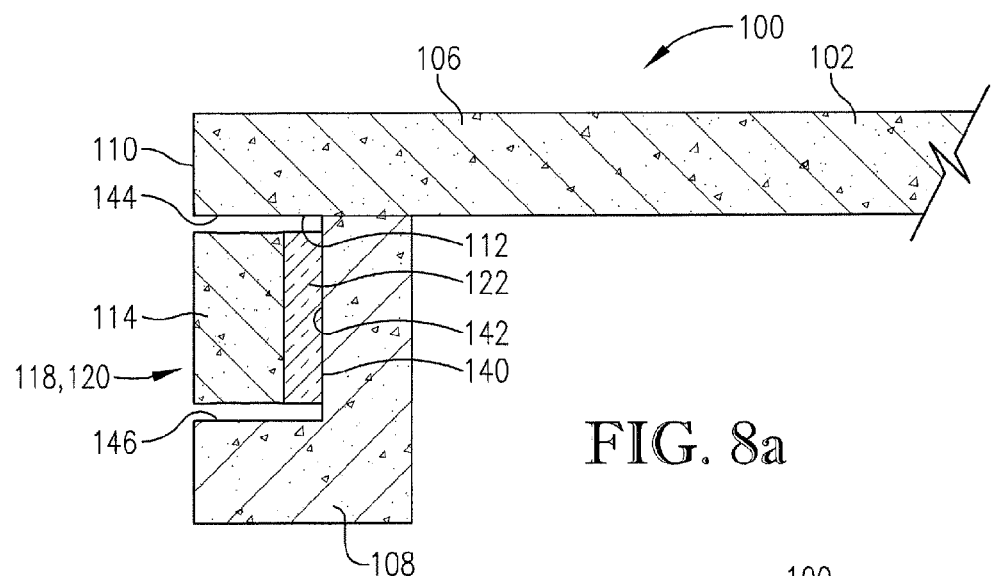
Figure 8B:
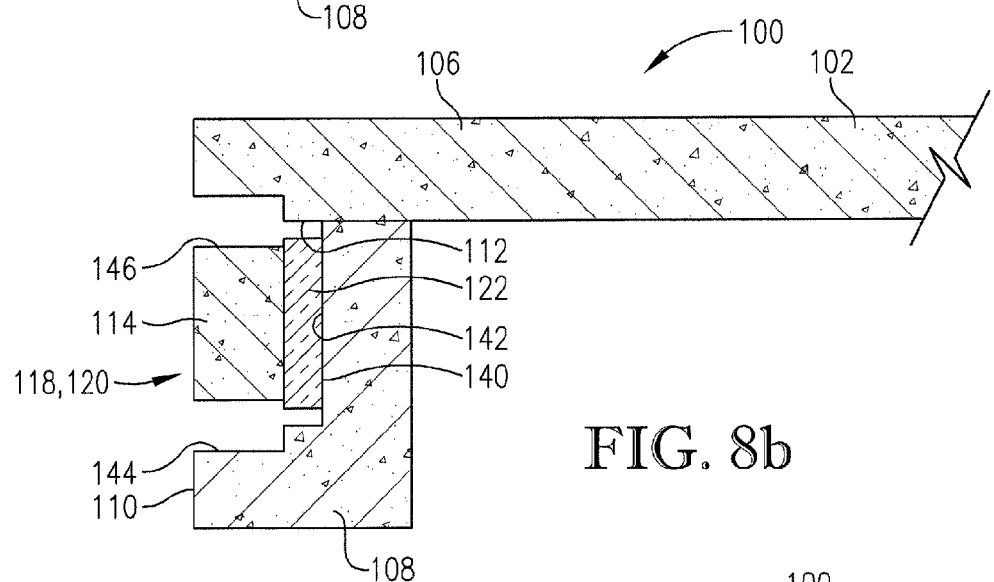
Figure 8C:
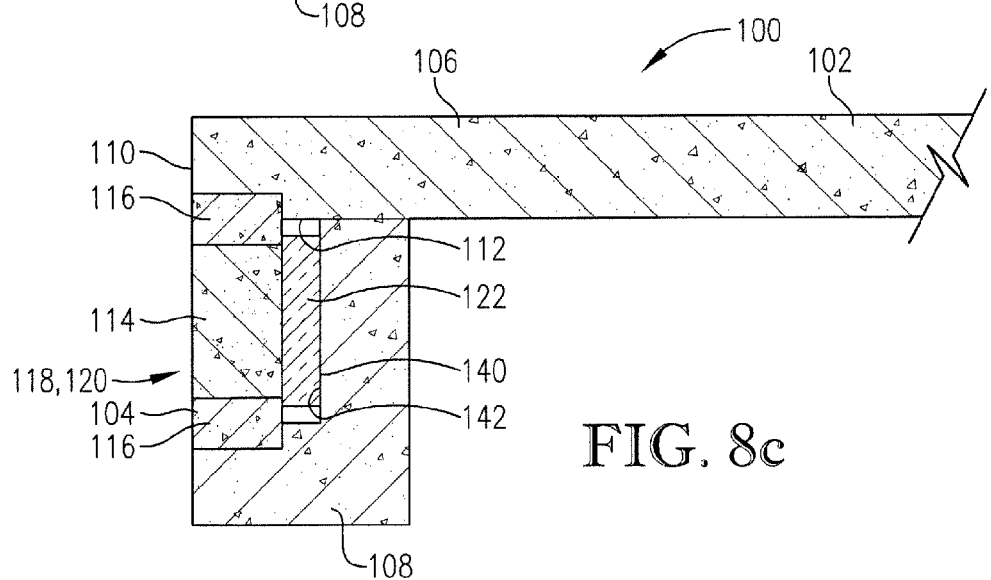
Figure 12:
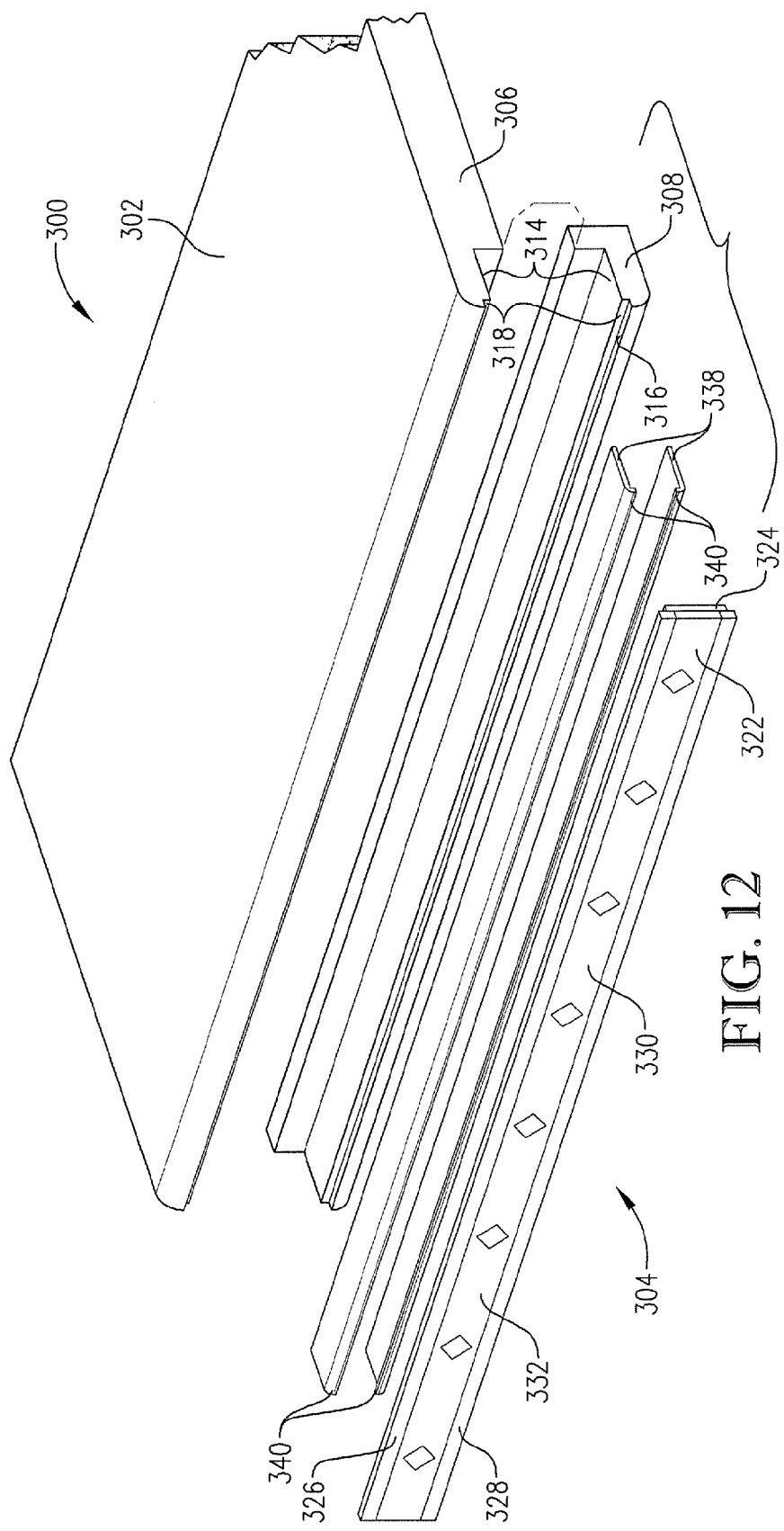
Figure 13:
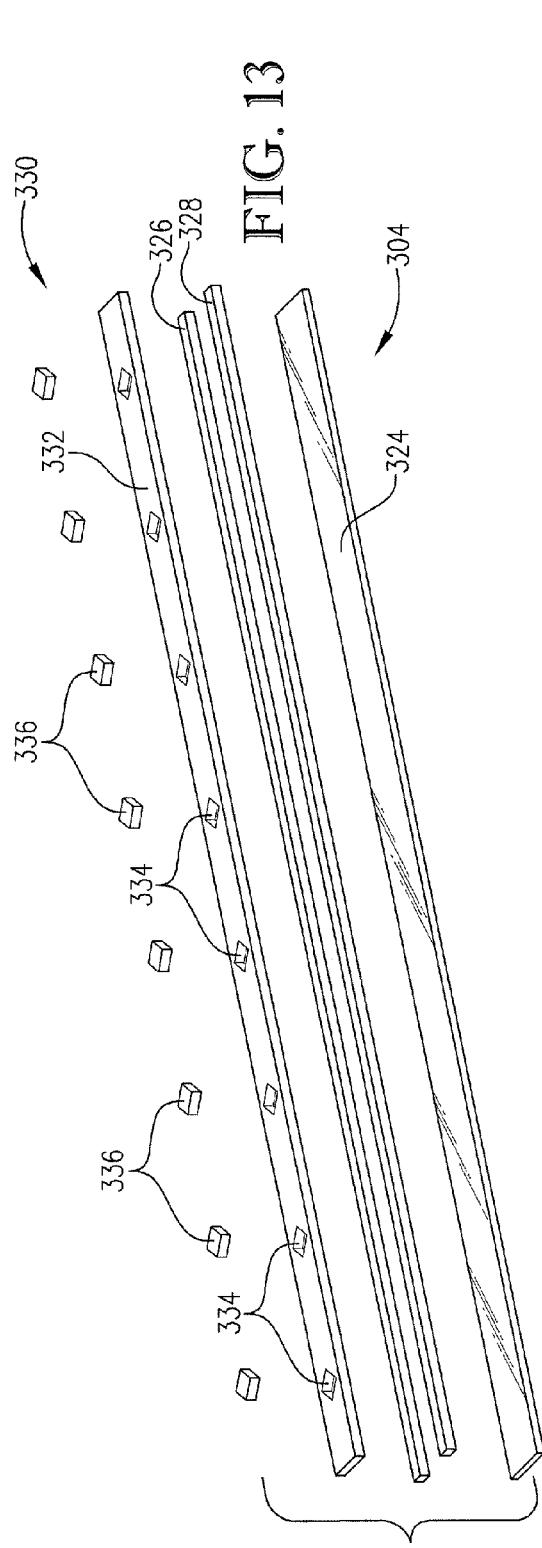
Figure 14:
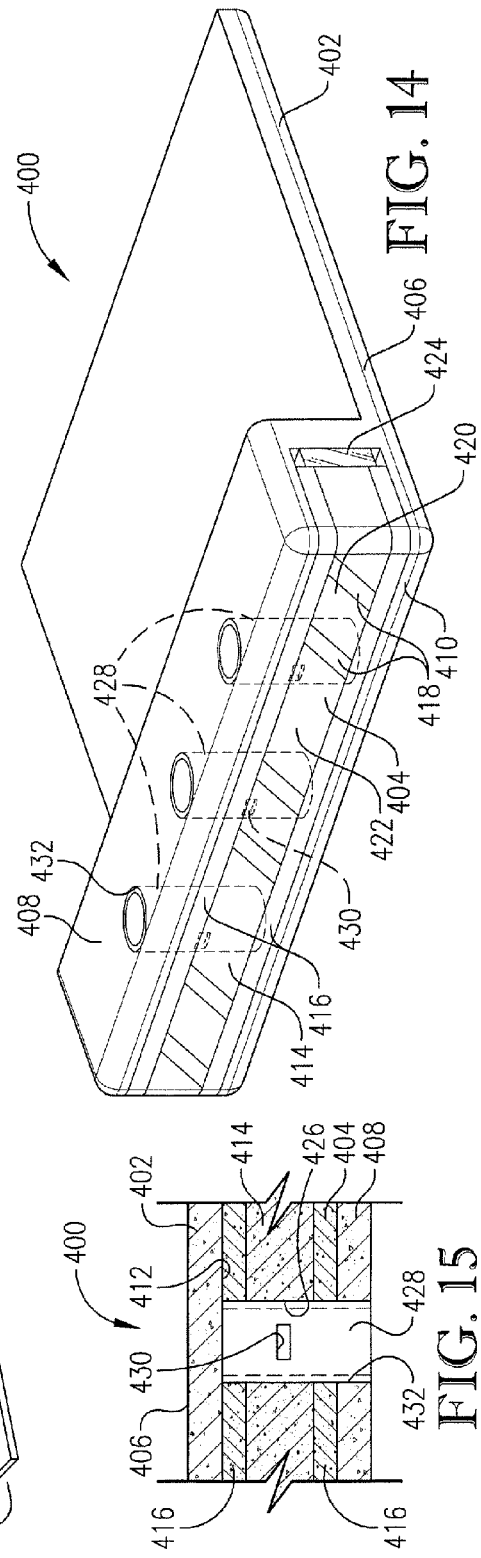
Figure 15:
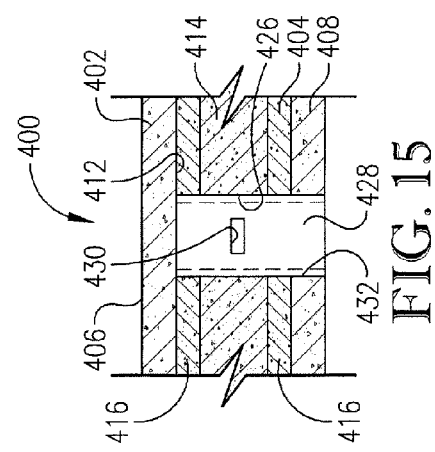
Figure 16:
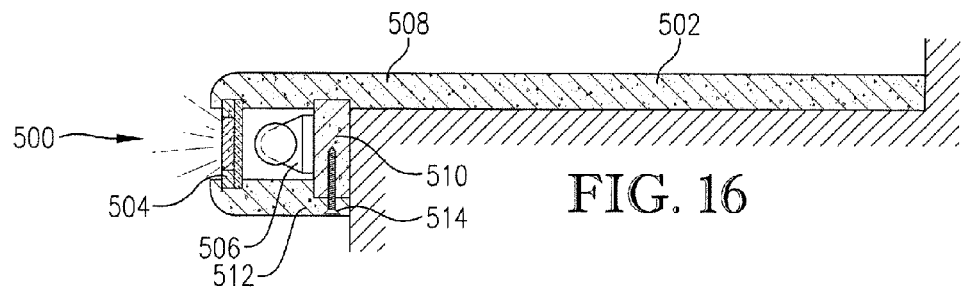
Figure 17:
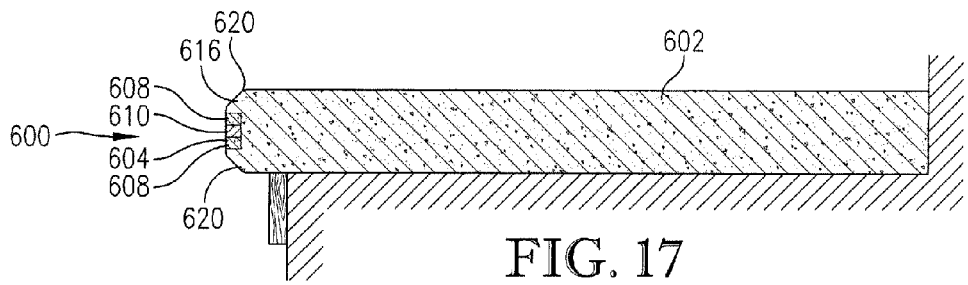
Figure 18A:
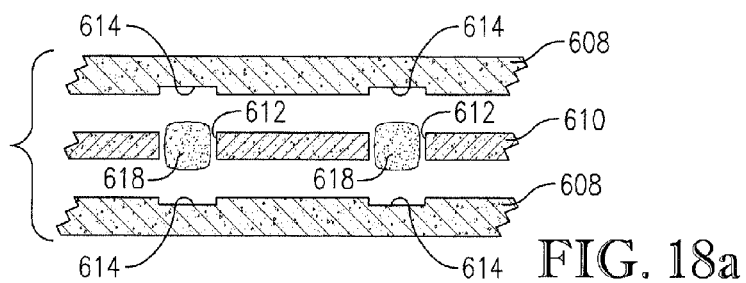
Figure 18B:
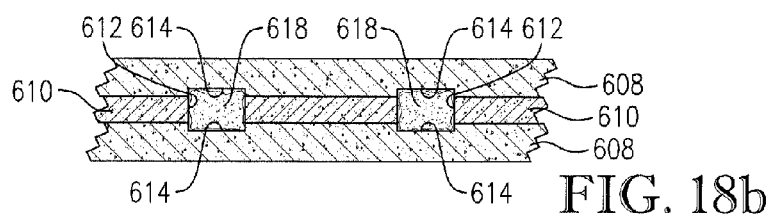
Figure 19:
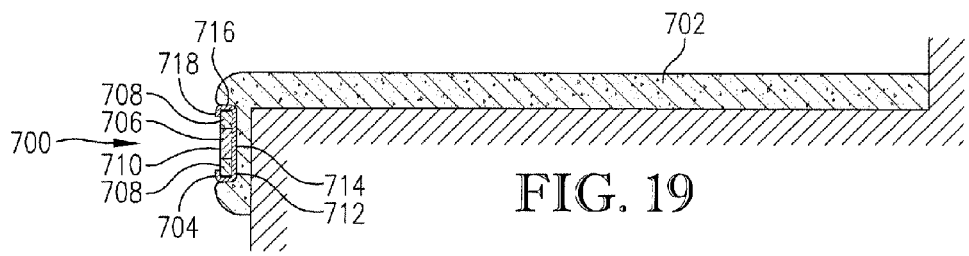
Figure 20:
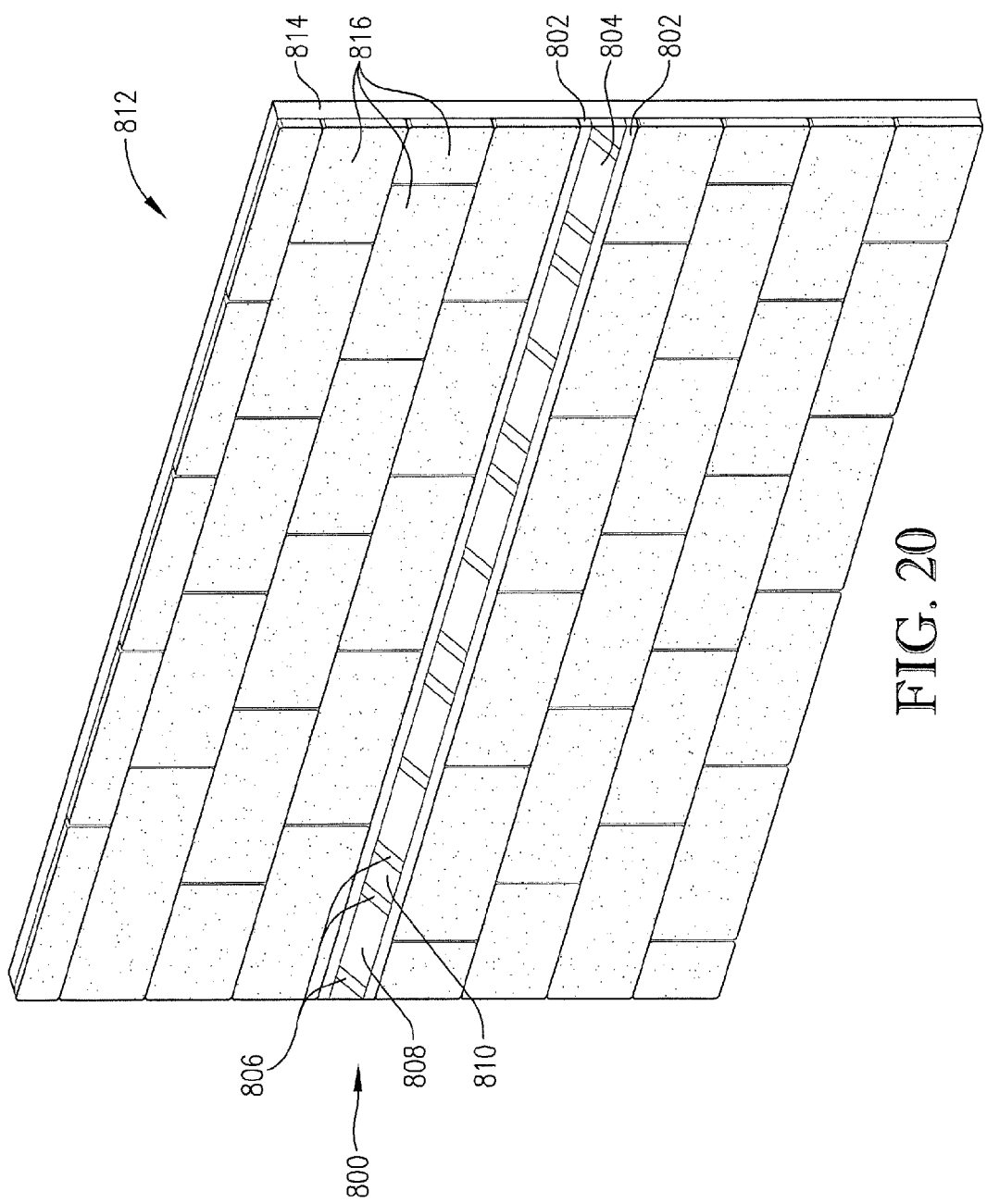

FIG. 6 is a side cross section of a second inlaid stone composite constructed in accordance with a second preferred embodiment of the present invention, showing the second inlaid stone composite mounted to a counter to provide a countertop, with the second inlaid stone composite in a finished condition and presenting a finished edge surface, and showing a second stone body, a second linear inlay assembly, and border sections that cooperatively form an inlaid margin of the second inlaid stone composite;

FIG. 7a is a perspective of a stone inlay sheet assembly used to construct the second inlay assembly shown in FIG. 6, with the inlay sheet assembly including a sheet of backing material and a plurality of elongated stone strips arranged in a longitudinal direction and adhered to one side of the sheet, and with each strip being adhered to adjacent strips so that the strips cooperatively present a continuous stone sheet;

FIG. 7b is a perspective of the stone inlay sheet assembly shown in FIG. 7a, showing a plurality of cuts made through the stone assembly in a lateral direction to define a plurality of backed inlay sheet sections that each include portions of each of the stone strips and a backing section;

FIG. 7c is a fragmentary perspective of the stone inlay sheet assembly shown in FIGS. 7a and 7b, showing an endmost one of the backed inlay sheet sections removed from the remainder of the stone inlay sheet assembly to depict intermediate backed inlay sheet sections that each present a pair of continuous longitudinal edges;

FIG. 7d is a perspective of one of the intermediate backed inlay sheet sections shown in FIGS. 7a-7c, showing opposite ends of the intermediate backed inlay sheet section trimmed to provide the second linear inlay assembly in an unfinished condition;

FIG. 8a is a fragmentary side cross section of the second inlaid stone composite shown in FIG. 6, showing the second stone body in an unfinished condition and the unfinished second linear inlay assembly secured in a groove of the second stone body by adhering the backing section to a base of the groove, with the second stone body and second linear inlay assembly cooperatively forming layer-separating grooves on opposite sides of the second linear inlay assembly;

FIG. 8b is a fragmentary side cross section of the second inlaid stone composite shown in FIGS. 6 and 8a, showing the layer-separating grooves in an enlarged condition by cutting the second stone body and second linear inlay assembly;

FIG. 8c is a fragmentary side cross section of the inlaid stone composite shown in FIGS. 6, 8a, and 8b, showing the border sections adhered in corresponding ones of the layer-separating grooves to provide the inlaid margin of the second inlaid stone composite, and also showing the edge surface of the inlaid margin prior to being finished;

FIG. 9a is a side cross section of a third inlaid stone composite constructed in accordance with a third preferred embodiment of the present invention, with the inlaid stone composite comprising an inlaid stone trim assembly that includes a third stone body, a third stone inlay assembly, and a backing;

FIG. 9b is a side cross section of the third inlaid stone composite shown in FIG. 9a, showing part of the second inlaid stone composite depicted in FIG. 6, with the third stone body and third stone inlay assembly being manufactured from the second inlaid stone composite by being cut from the inlaid margin of the second inlaid stone composite;

FIG. 10 is a perspective of a fourth inlaid stone composite constructed in accordance with a fourth preferred embodiment of the present invention;

FIG. 11 is a side cross section of the fourth inlaid stone composite shown in FIG. 10, showing an alternative laminated stone body and an alternative inlaid stone trim assembly that includes a fourth stone body and a fourth stone inlay assembly, and a backing, with the alternative laminated stone body and alternative inlaid stone trim assembly cooperatively presenting a longitudinal passage, and with the fourth inlaid stone composite also including elongated support strips secured in the passage and supporting the alternative inlaid stone trim assembly therein;

FIG. 12 is an exploded perspective of the fourth inlaid stone composite shown in FIGS. 10 and 11;

FIG. 13 is an exploded perspective of the alternative inlaid stone trim assembly shown in FIGS. 10-12;

FIG. 14 is a lower perspective of a fifth inlaid stone composite constructed in accordance with a fifth preferred embodiment of the present invention, showing a fifth laminated stone body, a fifth stone inlay assembly, and a plurality of support sleeves mounted in the inlaid margin of the fifth inlaid stone composite;

FIG. 15 is an enlarged fragmentary front cross section of the fifth inlaid stone composite shown in FIG. 14, showing one of the support sleeves secured within a hole that extends through the fifth stone inlay assembly and through a portion of the fifth stone body to a lower surface of the inlaid margin;

FIG. 16 is a side cross section of a sixth inlaid stone composite constructed in accordance with a sixth preferred embodiment of the present invention, showing a sixth stone body and a sixth stone inlay assembly that cooperatively form a longitudinal passage, and a powered light secured in the passage;

FIG. 17 is a side cross section of a seventh inlaid stone composite constructed in accordance with a seventh preferred embodiment of the present invention, showing a seventh stone body and a seventh stone inlay assembly;

FIG. 18a is an enlarged front cross section of the seventh inlaid stone composite shown in FIG. 17, showing inlay segments of the seventh stone inlay assembly prior to assembly and spaced adjacent to one another, with the seventh inlaid stone composite further including adhesive packets between the inlay segments;

FIG. 18b is an enlarged front cross section of the seventh inlaid stone composite shown in FIGS. 17 and 18a, showing the inlay segments in an assembled condition, with packets being punctured by the assembled segments and liquid adhesive flowing into corresponding cavities presented by the segments;

FIG. 19 is a side cross section of an eighth inlaid stone composite constructed in accordance with an eighth preferred embodiment of the present invention, showing an eighth stone body and an eighth stone inlay assembly with stone segments adhered in a tray; and FIG. 20 is a perspective of a ninth inlaid stone composite constructed in accordance with a ninth preferred embodiment of the present invention, with the ninth inlaid stone composite comprising an alternative inlaid stone trim assembly, and showing the trim assembly installed as part of a wall assembly that includes a substrate, tiles, and the trim assembly.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Stone Article with Patterned Trim

Turning initially to FIGS. 1-4, an inlaid stone composite assembly 30 preferably comprises a stone panel countertop mounted on counter C and includes a stone body 32 and a stone inlay assembly 34 secured to the body 32. As will be discussed further, the illustrated body 32 preferably presents a longitudinal groove 36 that receives the stone inlay assembly 34. The stone panel is also preferably made from natural granite, with the body 32 including one type of granite and the stone inlay assembly 34 including another type of granite. However, the principles of the present invention are equally applicable where the stone panel includes other types of natural or man-made stone materials. For instance, the stone panel may include one or more of various natural stone materials, such as marble, quartz, slate, limestone, sandstone, or onyx, that are quarried and pre-cut into stone sheets. Various man-made stone materials (e.g., engineered quartz) that include stone particles mixed with another material such as a thermoplastic material may also be included in the stone panel. Examples of such man-made stone materials include Silestone®, Zodiaq®, Cambria®, Caesarstone®, and Avonite™. Additional features of natural and man-made stone materials are disclosed in pending U.S. application Ser. No. 11/953,168, entitled INLAID STONE COMPOSITE, filed Dec. 10, 2007, which is hereby incorporated in its entirety by reference herein. It is also within the scope of the present invention where the illustrated stone panel includes other types of materials for decorative and/or structural purposes, such as steel, glass, wood, or synthetic resin.

While the illustrated inlaid stone composite assembly 30 is in the form of a panel with an inlaid margin, the assembly 30 could be constructed with a different form, e.g., to construct a decorative inlaid trim strip (as will be shown in a subsequent embodiment). Also, the illustrated panel preferably serves as a countertop on counter C, but the assembly 30 could be alternatively constructed for use in various kitchen or furniture applications, e.g., as a door, cabinet structure, trim, chair rail, or molding, without departing from the scope of the present invention.

The illustrated body 32 preferably includes laminated sections 38,40 that are each unitary and adhered to one another at a joint 42. However, it is also within the scope of the present invention where the body 32 comprises a unitary construction or where the body 32 includes more than two sections secured to one another (as will be shown in subsequent embodiments). The illustrated body 32 preferably includes an edge section that presents a longitudinally-extending forward edge surface 44 and has an edge thickness E. The body 32 also preferably includes a base section that projects from the edge section and has a base thickness B less than the edge thickness E (see FIG. 2). The body 32 preferably presents an edge thickness E that ranges from about one (1) centimeter to about one (1) foot, but it is within the scope of the present invention to have an edge thickness outside of this range. However, the body 32 could be alternatively shaped without departing from the scope of the present invention, e.g., by presenting a constant thickness throughout the entire body 32. Furthermore, the body 32 could present an alternative length or width.

Figure 1:
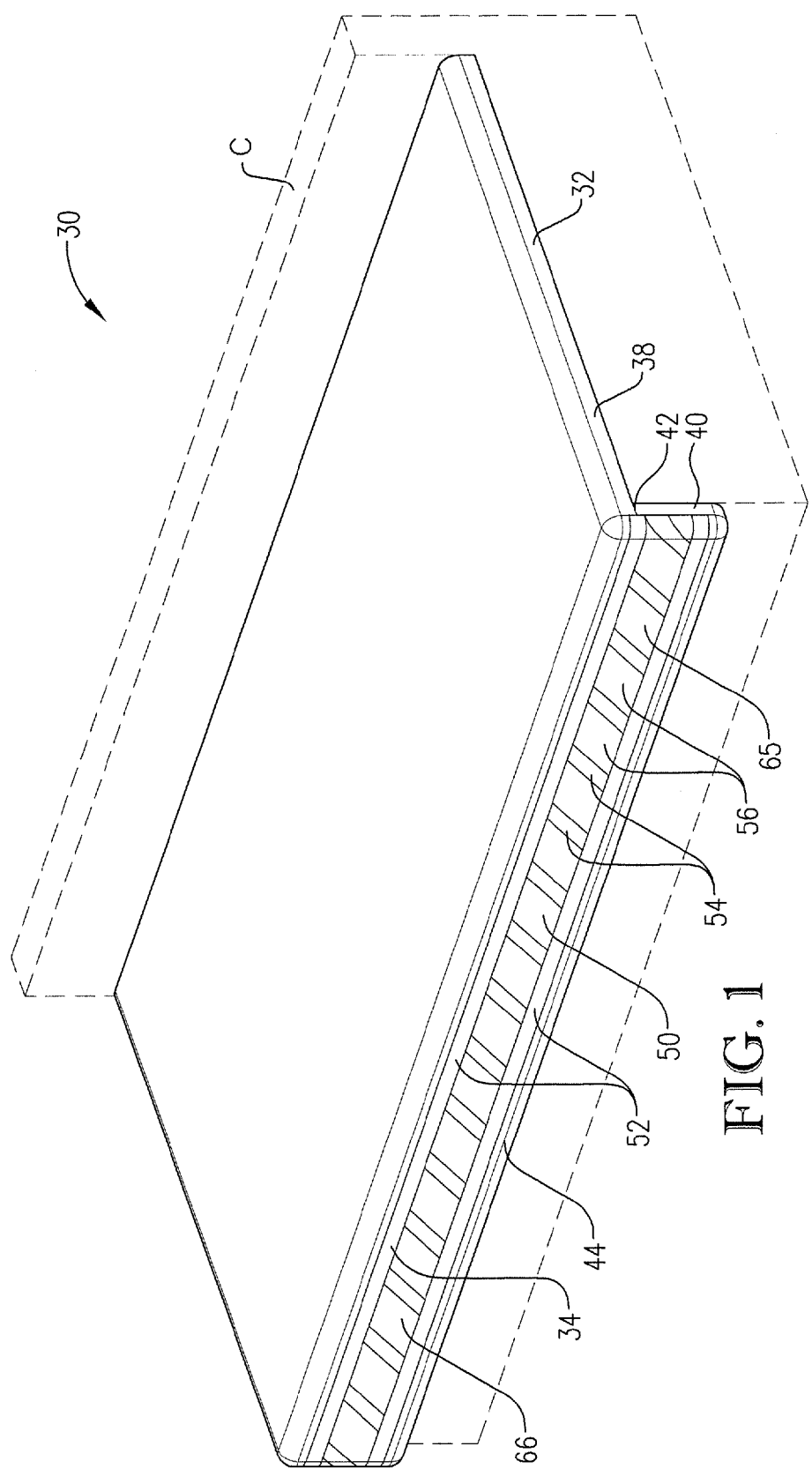
FIG. 1 is a perspective of an inlaid stone composite constructed in accordance with a first preferred embodiment of the present invention and mounted to a counter to provide a countertop.
Figure 4:
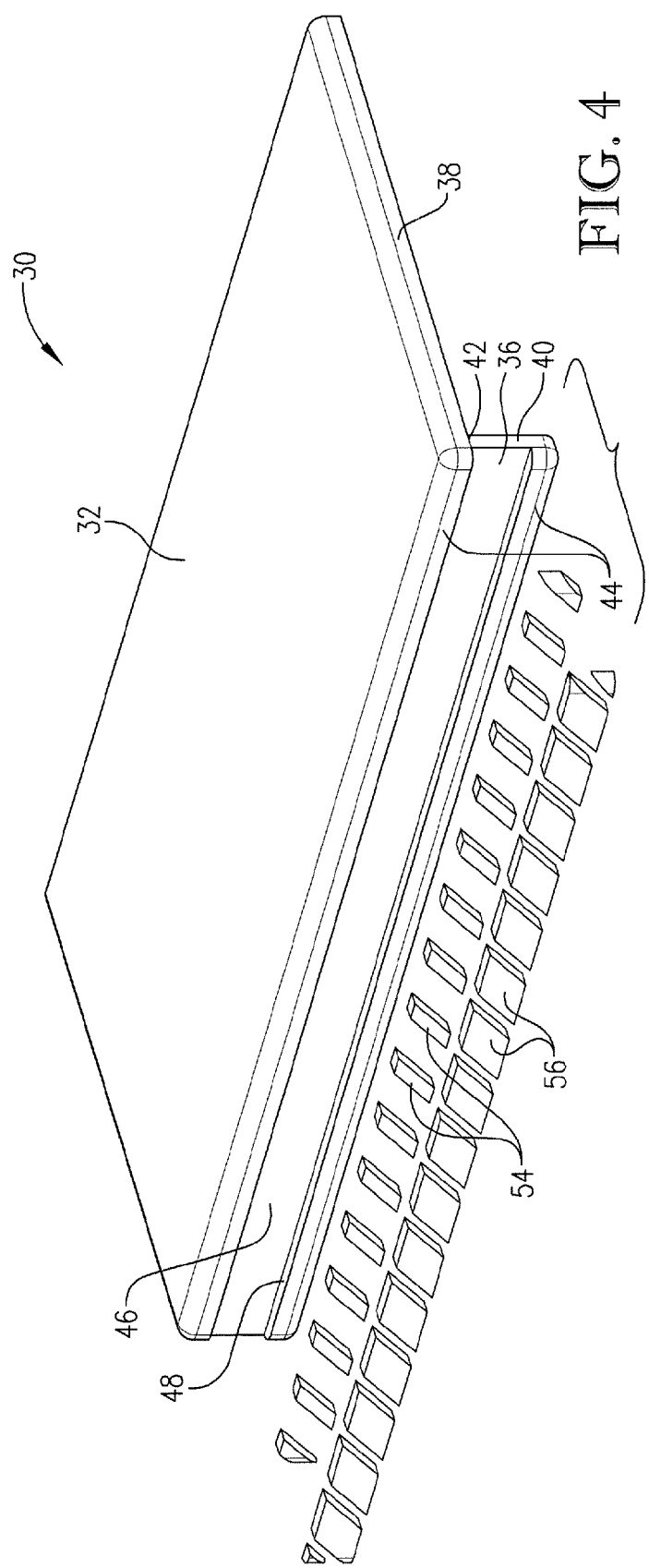
FIG. 4 is an exploded perspective of the inlaid stone composite shown in FIGS. 1 and 2, prior to securement of the linear inlay assembly within an elongated groove of the stone body, and prior to securement of the inlaid border sections within the groove.
Figure 5A:
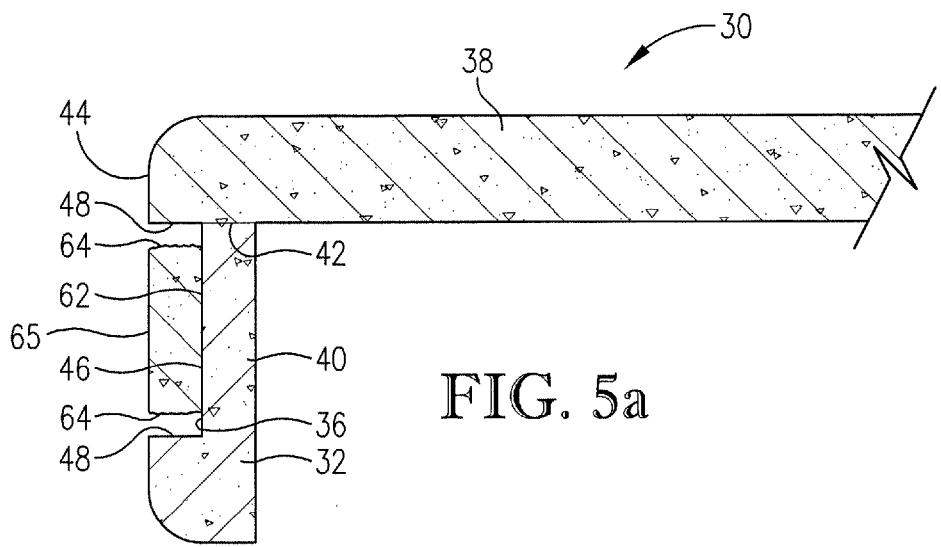
FIG. 5a is a fragmentary side cross section of the inlaid stone composite shown in FIGS. 1-4, showing the linear inlay assembly secured within the elongated groove prior to securement of the inlaid border sections within the groove, with the stone body and linear inlay assembly cooperatively forming layer-separating grooves on opposite sides of the linear inlay assembly.
Figure 5B:
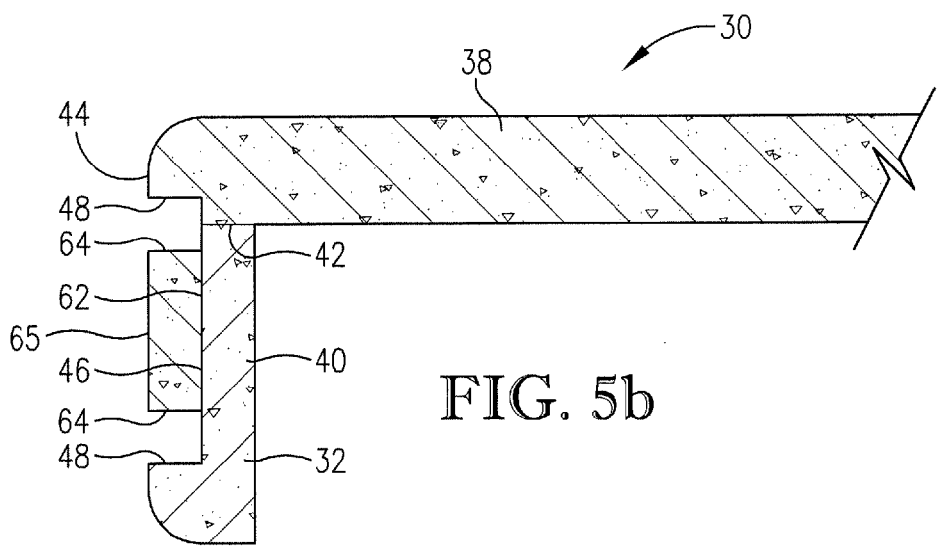
FIG. 5b is a fragmentary side cross section of the inlaid stone composite shown in FIGS. 1-4 and 5a, showing the layer-separating grooves in an enlarged condition by cutting the stone body and linear inlay assembly.
Figure 5C:
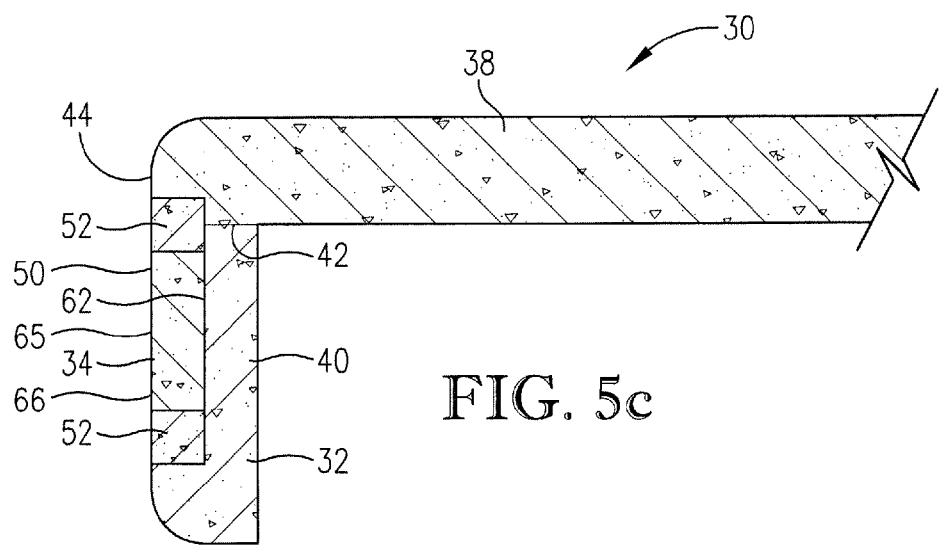
FIG. 5c is a fragmentary side cross section of the inlaid stone composite shown in FIGS. 1-4, 5a, and 5b, showing the border sections adhered in corresponding ones of the layer-separating grooves to provide an inlaid margin of the inlaid stone composite, and also showing the inlaid margin with the finished edge surface.

Turning to FIGS. 5a-5c, the body 32 presents the groove 36, and the groove 36 extends rearwardly from the edge surface 44 presented by the body 32 to a longitudinally-extending groove base surface 46. The groove 36 is preferably cut along the body 32 using a numerically-controlled machining tool (not shown) with a rotating dado blade assembly. One such preferred machining tool is designated as Automatic Vertical Edge Polishing Machine, Model LCT 522 CAI, manufactured by Marmo Meccanica SPA of Jesi, Italy, and further details of this machining tool and of a preferred dado blade assembly are disclosed in the above-incorporated U.S. Application. However, it is also within the scope of the present invention where the groove 36 is formed using another machine or method.

The groove 36 also presents longitudinal side surfaces 48 that extend from the edge surface 44 to the base surface 46. Thus, the illustrated groove 36 preferably presents a rectangular groove profile with flat surfaces 44,46, but it is also within the scope of the present invention where one or more of the surfaces 44,46 are not flat (e.g., arcuate) or where the groove 36 otherwise has an alternative profile. While the body 32 presents a single groove 36, the body 32 could present multiple grooves 36 for receiving corresponding inlay assemblies 34 without departing from the scope of the present invention.

The illustrated stone inlay assembly 34 preferably provides a decorative trim for the edge of body 32, but the principles of the present invention are equally applicable where the inlay assembly 34 is applied to the body at another location to provide trim, e.g., along the top surface of the body 32. The illustrated inlay assembly 34 preferably includes a patterned linear inlay assembly 50 and a pair of stone border sections 52. However, for some aspects of the present invention, the inlay assembly 34 could have an alternative number of border sections 52 or could be devoid of border sections 52.

The linear inlay assembly 50 is elongated and preferably includes a plurality of alternating stone segments 54,56 arranged end-to-end along the length of the linear inlay assembly 50 and are adhered to one another by a layer of adhesive 58 (see FIG. 3). The illustrated stone segments 54,56 preferably present different widths, but it is within the scope of the present invention where the segments 54,56 are substantially identical in size and shape. The stone segments 54,56 preferably include respective materials that are different from each other, e.g., where the materials comprise different stone materials or have different colors. The segments 54,56 and border sections 52 could include other non-stone materials, such as steel, glass, or synthetic resin. Also, the segments 54,56 could be secured to one another by an alternative construction or method, as will be shown in a subsequent embodiment. While the linear inlay assembly 50 includes a plurality of two different segments 54,56, it is also within the ambit of the present invention where the linear inlay assembly 50 includes segments of only one size and shape or a plurality of segments that include more than two segment shapes.

The illustrated stone segments 54,56 are preferably arranged in a continuous alternating pattern, with adhesive joints 60 therebetween that are each at an oblique angle relative to the longitudinal axis of the linear inlay assembly 50. Thus, the segments 54,56 present alternating stripes in a rope-like pattern. As will be shown in subsequent embodiments, the stone segments 54,56 could be constructed and arranged into alternative patterns without departing from the scope of the present invention. The linear inlay assembly 50 and the border sections 52 both preferably present a linear strip construction that extends along corresponding linear longitudinal axes. However, it is also within the scope of the present invention where the linear inlay assembly 50 and/or border sections 52 are curved or include multiple off-axis sections.

The linear inlay assembly 50 is preferably manufactured by applying adhesive 58 to segments 54,56 to adhere the segments 54,56 to each other. Manufacture of the linear inlay assembly 50 also preferably includes the step of positioning the segments 54,56 into a jig, such as an elongated tray (not shown), to permit curing of the adhesive 58. The illustrated linear inlay assembly 50 is preferably removed from the jig once the adhesive has cured and the segments 54,56 are adhered to one another. However, the principles of the present invention are applicable where the tray is not removed, but is retained with the linear inlay assembly 50 and is also secured in the groove 36. For example, the tray could include a synthetic resin that serves to adhere the linear inlay assembly 50 within the body 32 when the assembly 30 is heated in a kiln.

The illustrated linear inlay assembly 50 is preferably secured within the groove 36 by applying adhesive along an adhesive joint 62 between the linear inlay assembly 50 and the groove base surface 46 (see FIG. 5a). However, for some aspects of the present invention, the linear inlay assembly 50 could be alternatively secured to and/or positioned within the body 32. For instance, the linear inlay assembly 50 could be removably secured within the groove 36 by fasteners. Also, the illustrated linear inlay assembly 50 is preferably secured within the groove 36 so that the linear inlay assembly 50 and side surfaces 48 cooperatively present corresponding layer-separating grooves 64 that separate the linear inlay assembly 50 from the body 32 along the inlaid margin. But it also within the scope of the present invention where one groove 64 is formed along only one side of the linear inlay assembly 50, or where multiple layer-separating grooves 64 are formed along one side of the linear inlay assembly 50. In addition, the linear inlay assembly 50 could be formed to be snugly fit within the groove 36 such that any gap between the inlay assembly 50 and side surfaces 48 is substantially negligible (i.e., such that no grooves 64 are formed). Also, the linear inlay assembly 50 is preferably secured so that an edge surface 65 of the linear inlay assembly 50 is positioned adjacent to edge surface 44.

Once the linear inlay assembly 50 is secured within groove 36, the grooves 64 are preferably enlarged by cutting the sections 38,40 and linear inlay assembly 50 using the numerically-controlled machine tool. In the illustrated embodiment, this step also preferably serves to smooth the unfinished longitudinal sides of the linear inlay assembly 50. However, it is also within the scope of the present invention where the step of cutting the grooves 64 involves cutting only the sections 38,40 or only the linear inlay assembly 50. Furthermore, for some aspects of the present invention, the grooves 64 may be sized without cutting either of the sections 38,40. Yet further, for some aspects of the present invention, the assembly 30 may not include any grooves 64.

The illustrated border sections 52 are preferably adhered within the grooves 64, and an inlaid margin of the assembly 30 is then preferably formed to present a finished edge surface 66 of the assembly 30. The illustrated body 32, linear inlay assembly 50, and border sections 52 cooperatively form the inlaid margin from the groove base surface 46 to the finished edge surface 66. It is also within the ambit of the present invention where the inlaid margin is located along a different portion of the body 32 (e.g., where the inlaid margin extends from a finished top surface of the body 32). The step of forming the inlaid margin of the assembly 30 to provide the edge surface preferably includes the step of shaping the edge of the inlaid margin with a shaping wheel powered by the numerically-controlled machine tool, and additional features of a preferred shaping wheel are disclosed in the above-incorporated U.S. application. The forming step also preferably includes the step of polishing the edge of the inlaid margin. However, the forming step could include other steps to provide the finished edge surface 66. For example, the forming step could include the step of cutting excess material from the inlaid margin (e.g., either the body 32 or the stone inlay assembly 34) using a bridge saw to provide an unfinished continuous edge of the inlaid margin. Additional features of these steps and preferred tools, such as a preferred bridge saw, for performing the steps are disclosed in the above-incorporated U.S. Application.

Turning to FIGS. 6-20, alternative preferred embodiments of the present invention are depicted. For the sake of brevity, the remaining description will focus primarily on the differences of these alternative embodiments from the preferred embodiment described above.

Turning to FIG. 6, a second inlaid stone composite assembly 100 is constructed in accordance with a second embodiment of the present invention and broadly includes a stone body 102 and an alternative stone inlay assembly 104. The body 102 includes laminated sections 106,108 and presents an edge surface 110 and a groove 112. The stone inlay assembly 104 includes a patterned linear inlay assembly 114 and border sections 116. The linear inlay assembly 114 preferably comprises a backed inlay assembly with segments 118,120 adhered to each other and a glass backing 122 adhered to the segments 118,120. It has been found that the illustrated backing 122 provides structural support to the adhered segments 118,120 and serves to maintain the shape of the linear inlay assembly 114 while permitting manufacture of the linear inlay assembly 114 as discussed below. The principles of the present invention are also applicable where the backing 122 comprises a substrate with another material, such as stone, steel, or synthetic resin, to provide adequate support for the segments 118,120.

Turning to FIGS. 7a-7d, the illustrated linear inlay assembly 114 is preferably constructed from an inlay sheet assembly 124. The inlay sheet assembly 124 preferably includes a continuous glass backing sheet 126 and a plurality of elongated thick and thin stone strips 128,130 adhered to one another and to the backing sheet 126 to cooperatively form a continuous stone sheet. The illustrated backing sheet 126 is preferably continuous to permit the strips 128,130 to be adhered to one another and to provide structural support to the strips 128,130, particularly as the inlay sheet assembly 124 is cut into sections (as will be discussed below). However, the principles of the present invention are equally applicable where the backing sheet 126 is alternatively constructed. Furthermore, the backing sheet 126 could include other continuous material sheets made from an alternative material, such as steel, synthetic resin, stone, or organic material. The backing sheet 126 could further include an alternative structural construction, such as a mesh reinforcing layer (e.g., a fiberglass or wire mesh) or a honeycomb material.

The illustrated strips 128,130 each preferably have a corresponding cross-sectional shape that is uniform along the length of the strip, but the strips 128,130 could be alternatively shaped without departing from the scope of the present invention. For instance, the inlay sheet assembly 124 could include a plurality of stone strips where the strips each present substantially the same cross-sectional shape or where the strips present more than two different cross-sectional shapes. While the strips 128,130 preferably include a stone material, the strips 128,130 could include other materials, such as glass, steel, or synthetic resin.

The strips 128,130 are preferably adhered in an alternating arrangement such that each thick strip 128 is separated from another thick strip 128 by a thin strip 130. In particular, the illustrated strips 128,130 present sides 132 that extend longitudinally between opposite ends of the strips 128,130, and the strips 128,130 are preferably arranged so that corresponding sides 132 of adjacent strips 128,130 are in adhesive engagement with each other. Thus, the strips 128,130 are positioned in series relative to one another along a lateral direction. The strips 128,130 could be arranged into a different series pattern without departing from the scope of the present invention. Furthermore, the inlay sheet assembly 124 could include differently shaped strips arranged end-to-end along the inlay sheet, i.e., arranged along the longitudinal direction.

Turning to FIGS. 7b-7d, the adhered inlay sheet assembly 124 is used to produce linear inlay assembly 114 by the step of making a plurality of cuts 134 in the lateral direction, with the cuts 134 being spaced apart to define a plurality of endmost and intermediate cut inlay sheet sections 136,138. It has been found that the construction of the inlay sheet assembly 124 permits fast and accurate cutting of the sections 136,138. For example, it has been found that the backing sheet 126 restricts the portions of stone strips 128,130 in each section 136,138 from warping or causing the sections 136,138 to become warped. While the distance between each pair of adjacent cuts 134 is preferably substantially the same, it is also within the scope of the present invention where the spacing is different between different pairs of adjacent cuts 134 to produce sheet sections 138 of different widths. The illustrated cuts 134 are preferably made using a conventional bridge saw (not shown) with a diamond-tipped blade (also not shown), and additional details concerning the preferred bridge saw are disclosed in the above-incorporated U.S. application. However, the cuts 134 could also be alternatively made, e.g., using a conventional waterjetting machine, without departing from the scope of the present invention. The illustrated cuts 134 are made in the lateral direction, which is preferably at an oblique angle to the longitudinal direction of the strips 128,130. However, the lateral direction of the cuts 134 could be at an alternative angle relative to the longitudinal direction, e.g., substantially perpendicular or substantially parallel to the longitudinal direction.

Following the cutting step above, the sections 136 are generally discarded and sections 138 are preferably trimmed to the desired length to produce the linear inlay assembly 114 (see FIG. 7d). While the step of trimming the sections 138 is preferably performed after the sections 138 are cut from the inlay sheet assembly 124, it is also within the scope of the present invention where the sections 138 are trimmed to the proper length prior to being separated from the inlay sheet assembly 124. Furthermore, it is also within the ambit of the present invention where the step of trimming the sections 138 is not required to produce the linear inlay assembly 114 with the desired length, e.g., where the strips 128,130 and backing sheet 126 are constructed to present the desired length prior to being adhered to one another.

Turning to FIGS. 7d and 8a-8c, the linear inlay assembly 114 includes segments 118,120 corresponding to portions of strips 128,130, with the segments 118,120 being adhered to the glass backing 122. The linear inlay assembly 114 is preferably secured within groove 112 by applying adhesive along joint 140 between the linear inlay assembly 114 and a groove base surface 142. The illustrated linear inlay assembly 114 is secured within the groove 112 so that the linear inlay assembly 114 and side surfaces 144 of the groove 112 present corresponding grooves 146.

Turning to FIGS. 8b and 8c, once the linear inlay assembly 114 is secured within groove 112, the grooves 146 are preferably enlarged using the dado cutting tool of the numerically-controlled machine tool discussed above. Preferably, the grooves 146 are enlarged by cutting the linear inlay assembly 114 and the sections 106,108, but not the glass backing 122. However, the grooves 146 could also be enlarged by cutting the glass backing 122 without departing from the scope of the present invention.

The border sections 116 are adhered within the grooves 146 to form the inlaid margin of the assembly 100, and the inlaid margin can then be formed to present a finished edge surface 148 of the assembly 100. The step of forming the inlaid margin to provide the edge surface 148 includes the step of polishing the edge of the inlaid margin. However, it is also within the scope of the present invention where the shaping step includes the step of cutting excess material from the inlaid margin and/or shaping the edge of the inlaid margin with a shaping tool, as discussed above.

Layered Stone Trim Strip

Turning to FIGS. 9a and 9b, a third inlaid stone composite assembly 200 is constructed in accordance with a third embodiment of the present invention. The illustrated assembly 200 comprises a stone trim strip assembly that can be incorporated into a variety of decorative applications. The assembly 200 broadly includes an alternative stone body 202, an alternative stone inlay assembly 204, and a backing 206. The backing 206 preferably comprises a continuous glass strip, but could comprise a substrate with other materials for providing structural support, such as stone, steel, synthetic resin. Furthermore, the backing 206 could include features for securing the assembly 200 to another object, such as furniture, cabinetry, or an appliance. For example, the backing 206 could include a magnetic material for removably securing the assembly 200 to a metal object (not shown). Alternatively, the backing 206 could include an elongated tray (not shown) with integral fasteners for attaching the assembly to an object.

The alternative stone body 202 includes a pair of body sections 208,210, and the inlay assembly 204 includes a patterned linear inlay assembly 212 and border sections 214. The linear inlay assembly 212 includes a plurality of stone segments 216 adhered to one another. The illustrated assembly 200 is preferably manufactured from the finished inlaid margin of the panel assembly 100, with the inlaid margin preferably being manufactured by the steps used to manufacture the assembly 100. However, for some aspects of the present invention, the inlaid margin used to manufacture the assembly 200 could be alternatively constructed or constructed using alternative steps.

Once the inlaid margin of assembly 100 is completed, the body 202 and stone inlay assembly 204 are created by making a longitudinal cut 218 through the body 202 and stone inlay assembly 204 of the inlaid margin and thereby separating the body 202 and stone inlay assembly 204 from a remainder of the inlaid margin. Thus, the body 202 includes at least part of the body 102 and the stone inlay assembly 204 includes at least part of the stone inlay assembly 104, with the assembly 200 preferably presenting the finished edge surface 148. However, for some aspects of the present invention, the body 202 and stone inlay assembly 204 could be shaped to produce the finished edge surface 148 after the step of cutting the body 202 and stone inlay assembly 204 from the inlaid margin of assembly 100. The illustrated body 202 and stone inlay assembly 204 present a thickness (measured from the edge surface 148 to the cut 218) of about one-quarter inch. Preferably, the thickness of the body 202 and stone inlay assembly 204 can range from about one-sixteenth inch to about one inch, but the thickness could also be outside of this range. While a single cut 218 is made to the illustrated inlaid margin to produce body 202 and stone inlay assembly 204, it is also within the scope of the present invention where multiple cuts are made through the inlaid margin to produce the assembly 200 or to produce multiple assemblies 200 from the single inlaid margin.

The illustrated body 202 and stone inlay assembly 204 are preferably adhered to backing 206 after being separated from the inlaid margin. However, it is also within the scope of the present invention where the backing 206 is adhered prior to the step of separating the body 202 and stone inlay assembly 204 (e.g., where the backing 206 is adhered to the edge surface 148). Thus, the backing 206 provides structural reinforcement to the body and stone inlay assembly 204.

Backlighted Stone Composite

Turning to FIGS. 10-13, a fourth inlaid stone composite assembly 300 is constructed in accordance with a fourth embodiment of the present invention. The illustrated assembly 300 comprises a backlighted stone countertop panel and broadly includes an alternative stone body 302 and an alternative stone trim assembly 304 similar to assembly 200. The body 302 is mounted on counter C and includes laminated sections 306,308. The body 302 also presents a longitudinal groove 310 defined by a groove base surface 312, side surfaces 314,316, and a shoulder 318 between the side surfaces 314,316, with the body 302 also presenting an edge surface. The groove 310 is formed along the edge surface preferably after the sections 306,308 are laminated, but could also be formed prior to lamination.

The stone trim assembly 304 broadly includes an alternative stone body 320, an alternative stone inlay assembly 322, and a glass backing 324. The backing 324 preferably comprises a continuous glass strip, but could comprise a substrate with another translucent material, such as a translucent stone or a polycarbonate material, to permit light to pass through the stone inlay assembly 322, as will be discussed further. The alternative stone body 320 includes a pair of body sections 326,328, and the inlay assembly 322 includes a patterned linear inlay assembly 330. The linear inlay assembly 330 includes a stone segment 332 that presents a plurality of diamond-shaped holes 334 spaced along the length of the segment 332. The holes 334 are preferably cut using a conventional watejetting machine (not shown), but could be formed by another method. The linear inlay assembly 330 also includes a plurality of glass segments 336 secured in corresponding holes 334. The glass segments 336 each preferably comprise a crushed glass powder (sometimes referred to as "fritz") mixed with a resin and cured within the corresponding hole 334. However, other materials could be adhered within holes 334, such as another stone segment or a steel segment, to provide a different decorative appearance.

The illustrated assembly 304 is preferably manufactured from a finished inlaid margin (not shown), using process steps similar to those used to manufacture the assembly 200. In particular, the stone body 320 and linear inlay assembly 330 are preferably constructed as part of the inlaid margin with a finished edge surface. In addition, when constructing the inlaid margin, a layer of non-translucent paint is preferably applied to abutting edges of the stone segment 332 and segments 336 and to abutting edges of stone segment 332 and body sections 326,328. In this manner, light passing into segments 332,336 is restricted from passing into adjacent segments or into body sections 326,328. Furthermore, the use of non-translucent paint has been found to restrict colors in one segment from appearing to "bleed" into an adjacent segment. While a non-translucent paint is preferred for this purpose, it is also within the scope of the present invention where an alternative method is used, such as inserting a thin metal foil between adjacent segments, or applying a layer of non-translucent adhesive between adjacent segments.

The illustrated stone body 320 and linear inlay assembly 330 are separated from a remainder of the inlaid margin as discussed in the previous embodiment. The stone body 320 and linear inlay assembly 330 are then preferably adhered to the glass backing 324 to produce the assembly 304.

The assembly 304 is then preferably secured to the stone body 302. In particular, the assembly 300 preferably includes a pair of elongated support sections 338 to mount the assembly 304. The support sections 338 are substantially identical and comprise an elongated steel strip with a lip 340. However, the sections 338 could be alternatively configured for supporting the assembly 304 in the groove 310 without departing from the scope of the present invention. The illustrated sections 338 could include various alternative materials, such as stainless steel, copper, aluminum. Furthermore, the sections 338 could include various finishes or surface textures to reflect or otherwise direct light from assembly 300.

The support sections 338 are preferably adhered to corresponding side surfaces 314, with each lip 340 being positioned adjacent the shoulder 318. The support sections 338 cooperatively present an elongated opening between the lips 340 that permit light to pass through the assembly 304. Thus, the assembly 304 is adhered to the body 302 and support sections 338 by adhering the glass backing 324 to the lips 340 and the side surfaces 314, and by adhering the linear inlay 330 to the shoulder 318 and side surfaces 316.

The assembly 304 and stone body 302 cooperatively present an internal passage 342 operable to receive a light 342, which is mounted to the assembly 304. The illustrated light 342 is preferably an elongated, continuous powered light under the trade name Light Tape X, manufactured by Electro-LuminiX® Lighting Corporation of 600 HP Way, Chester, Va. 23836. However, it is also within the scope of the present invention where another type of powered light is incorporated into assembly 300, such as a series of LEDs, fiber optic lights, fluorescent bulbs, or incandescent bulbs.

Turning to FIGS. 14 and 15, a fifth inlaid stone composite assembly 400 is constructed in accordance with a fifth embodiment of the present invention. The illustrated assembly 400 comprises an alternative stone countertop panel with a backlighted inlaid margin and broadly includes an alternative stone body 402 and an alternative stone inlay assembly 404 similar to stone inlay assembly 104. The body 402 includes laminated sections 406,408 and presents an edge surface 410 and a groove 412. The illustrated section 406 preferably comprises a premanufactured stone tile with a standard length, width, and thickness. The stone inlay assembly 404 includes a patterned linear inlay assembly 414 and border sections 416 that are all preferably translucent. The stone inlay assembly 404 also includes non-translucent paint (not shown) applied in the elongated joints between the linear inlay assembly 414 and border sections 416. As discussed above, the paint restricts light from "bleeding" from one translucent section into another translucent section. The linear inlay assembly 414 preferably comprises a backed inlay assembly with segments 418,420,422 adhered to each other and a glass backing 424 adhered to the segments 418,420, 422. Again, the backing 424 could include another material, such as stone, steel, or synthetic resin, to provide adequate support for the segments 418,420,422.

The stone inlay assembly 404 is manufactured using substantially the same steps used to manufacture stone inlay assembly 104. In addition to those steps, a series of spaced-apart transverse through-holes 426 presented by the stone inlay assembly 404 are preferably cut by a conventional waterjetting machine (not shown) prior to securing the stone inlay assembly 404 within the stone body 402.

Furthermore, the stone inlay assembly 404 is secured within the stone body 402 using substantially the same steps used to secure the stone inlay assembly 104 within the stone body 102.

The assembly 400 also includes multiple cylindrical sleeves 428 secured within the inlaid margin of the assembly 400 and are operable to receive discrete lamps (not shown), as will be discussed. The sleeves 428 are each unitary and present opposite ends and a slot 430 spaced between the ends. Spaced-apart holes 432 are preferably drilled into the lower laminated section 408 and are aligned with corresponding holes 426. The holes 432 are preferably drilled prior to securing the stone inlay assembly 104 within the stone body 102, but could be drilled after the stone inlay assembly 104 is secured without departing from the scope of the present invention. Thus, corresponding pairs of holes 426,432 cooperatively present blind holes, with corresponding openings in the bottom of the section 408.

Once the holes 426,432 are formed in assembly 400, the sleeves 426 can be inserted through openings in the section 408 and adhered within the holes 424,430, with the slots 428 being positioned adjacent a finished edge surface of the assembly 400. The sleeves 426 are each configured to receive a corresponding powered lamp (not shown), with any wiring (not shown) for the lamps extending through the openings and to a power source (not shown). The lamps emit light that passes through the slot 428 and the linear inlay 414 and into ambient. The non-translucent paint restricts light from passing from the linear inlay 414 and into the border sections 416. Furthermore, the sleeves 426 also restrict light from passing from the blind holes into the border sections 416. Thus, the illustrated construction serves to illuminate only a selected part of the stone inlay assembly 404.

Turning to FIG. 16, a sixth inlaid stone composite assembly 500 is constructed in accordance with a sixth embodiment of the present invention. The illustrated assembly 500 comprises another alternative backlighted stone countertop panel and broadly includes an alternative stone body 502, an alternative translucent stone inlay assembly 504, and an alternative powered light 506. The alternative stone body 502 includes laminated sections 508,510 and removable section 512 secured to sections 508,510 by a plurality of screws 514. The stone inlay assembly 504 is removably received in corresponding grooves of the sections 508,512. In this manner, the light 506 can be selectively accessed for maintenance. Furthermore, this construction also permits the stone inlay assembly 504 to be replaced with another stone inlay assembly (not shown). Thus, the illustrated assembly 500 can be reconfigured to present different decorative edge trim designs.

Alternative Embodiments

Turning to FIGS. 17, 18a, and 18b, a seventh inlaid stone composite assembly 600 is constructed in accordance with a seventh embodiment of the present invention and broadly includes an alternative stone body 602 and an alternative stone inlay assembly 604. The body 602 comprises a unitary section and presents an edge surface and a groove. The stone inlay assembly 604 comprises a linear inlay with outer segments 608, and intermediate segments 610 adhered to each other. The intermediate segments 610 include a plurality of holes 612 spaced along the length of the stone inlay assembly 604. The holes 612 are preferably cut by a waterjetting machine, but could be cut by a drill or another suitable machine. The outer segments 608 include recessed flats 614 formed in one side of the segments 608 and also spaced along the length of the stone inlay assembly 604. Each flat 614 preferably includes a flat base and a substantially straight circular sidewall. However, the sidewall could also taper radially inwardly in a direction toward the base. For instance, the sidewall could taper at an angle that ranges from about 10 degrees to about 15 degrees relative to axis of the sidewall. The flats 614 of one segment 608 are preferably substantially aligned with flats 614 of the other segment 608 and with holes 612 so that the segments 608,610 cooperatively form a plurality of enclosed cavities along stone inlay assembly 604 that are spaced from an alternative edge surface 616 of the assembly 600. The stone inlay assembly 604 further includes discrete adhesive packets 618 positioned in the cavities to adhere the segments 608,610 to one another. The segments 608,610 are adhered by positioning the segments 608,610 adjacent to each other and aligning the holes 612 and flats 614. The packets 618, which preferably have a maximum width dimension that is larger than a corresponding width of the cavities, are then inserted into the cavities. As the segments 608,610 are brought into engagement with each other, the segments 608,610 compress the packets 618 and cause the packets 618 to burst so that liquid adhesive spreads through the cavities and into the interstitial spaces between the segments 608,610.

When the stone inlay assembly 604 is secured to the stone body 602, the alternative finished edge surface 616 is formed. In particular, the edge surface 616 comprises a chamfered edge profile with chamfered portions 620. The profile is formed by first forming the chamfered portions 620 using a shaping tool (such as the polishing machine discussed above). The edge surface 620 is then polished using the shaping tool (or another suitable polishing tool).

Turning to FIG. 19, an eighth inlaid stone composite assembly 700 is constructed in accordance with an eighth embodiment of the present invention and broadly includes an alternative stone body 702 and an alternative stone inlay assembly 704. The stone inlay assembly 704 includes a linear inlay 706, with outer and intermediate segments 708,710, and a decorative tray 712 that receives the linear inlay 706. The illustrated tray 712 comprises an elongated channel with a substantially constant cross section and presents a base portion 714, side portions 716 that extend from the base portion, and lip portions 718 that project toward each other from the corresponding side portions. The illustrated tray 712 could include various materials, such as stainless steel, copper, aluminum. Furthermore, the tray 712 could include various decorative finishes.

The linear inlay 706 is constructed using steps similar to those used for the linear inlay assembly 50. In particular, the segments 708,710 are arranged into the tray 712 with adhesive applied to abutting surfaces of the segments 708,710. The illustrated linear inlay 706 is preferably adhered within the tray 712. However, it is also within the scope of the present invention where the linear inlay 706 is removably received within tray 712, e.g., to permit selective installation or removal of the linear inlay 706 by sliding the linear inlay 706 into and out of the tray 712. Subsequently, the linear inlay 706 and decorative tray 712 are adhered within a groove of the stone body 702.

Turning to FIG. 20, a ninth inlaid stone composite assembly 800 is constructed in accordance with a ninth embodiment of the present invention. The assembly 800 comprises a stone trim assembly and broadly includes an alternative stone body 802 and an alternative stone inlay assembly 804. The stone inlay assembly 804 comprises a linear inlay with outer segments 806,808,810 adhered to each other. The assembly 800 is manufactured using similar steps used to make the assembly 200. In particular, the assembly 800 is manufactured from an inlaid margin (not shown) of another stone composite assembly by cutting the assembly 800 from a remainder of the inlaid margin. However, a backing is not adhered to the stone inlay assembly 804 after being separated from the inlaid margin. The illustrated assembly 800 is incorporated into a tiled wall assembly 812, which includes a substrate panel 814 including wood, gypsum board, or cement board (such as DUROCK®), a plurality of tiles 816, and the assembly 800.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A method of manufacturing an inlaid stone composite having a plurality of stone layers, said method comprising the steps of:
   (a) forming a longitudinally extending groove in a first one of the stone layers, with the groove extending inwardly from an edge surface of the first stone layer to define a groove base;
   (b) securing a plurality of stone segments relative to one another exteriorly of the groove to provide a second one of the stone layers; and
   (c) securing the second stone layer within the groove, with the first and second stone layers cooperatively forming an inlaid margin.

2. The method as claimed in claim 1,
step (a) comprising the step of dado cutting the groove.

3. The method as claimed in claim 1,
step (b) including the step of adhering the stone segments relative to one another.

4. The method as claimed in claim 3,
step (b) including the step of arranging stone segments end-to-end to form the second stone layer, with the second stone layer presenting opposite ends and being substantially continuous from one end to the other end.

5. The method as claimed in claim 4,
said arranging step including the step of positioning the stone segments into a holding tray that extends between the ends of the second stone layer.

6. The method as claimed in claim 5; and
(d) removing the second stone layer from the holding tray after said step of adhering the stone segments and before step (c).

7. The method as claimed in claim 5,
step (c) including the step of securing the holding tray and the second stone layer within the groove.

8. The method as claimed in claim 1,
step (b) including the step of adhering a plurality of elongated stone strips oriented in a longitudinal direction, with adjacent stone strips being positioned alongside one another and spaced along a lateral direction to form a stone sheet.

9. The method as claimed in claim 8,
step (b) including the step of adhering the elongated stone strips to a sheet of backing material.

10. The method as claimed in claim 9,
step (b) including the step of cutting the adhered sheets in the lateral direction at a plurality of spaced apart locations along the sheet to form at least one second stone layer, with the stone segments being from corresponding ones of the stone strips.

11. The method as claimed in claim 10,
said lateral direction being at an oblique angle to the longitudinal direction.

12. The method as claimed in claim 1; and
(d) forming a layer-separating groove in at least one of the stone layers, with the groove separating the stone layers from each other along the inlaid margin.

13. The method as claimed in claim 12,
step (d) including the step of forming another layer-separating groove in at least one of the stone layers, with the layer-separating grooves being on opposite sides of the second stone layer.

14. The method as claimed in claim 12; and
(e) adhering a third stone layer within the layer-separating groove.

15. The method as claimed in claim 1; and
(d) cutting longitudinally through the first and second stone layers of the inlaid margin to separate an inlaid margin strip from a remainder of the inlaid margin, with the inlaid margin strip including at least part of the first and second stone layers and presenting a finished edge surface.

16. The method as claimed in claim 15; and
(e) adhering the inlaid margin strip to a backing strip.

17. The method as claimed in claim 15;
(e) forming a longitudinally extending groove in a third stone layer, with the groove extending inwardly from an edge surface of the third stone layer to define a groove base of the third stone layer that extends along the third stone layer edge surface; and
(f) securing the inlaid margin strip to the third stone layer to form an elongated passage defined between the inlaid margin strip and the third stone layer groove base.

18. The method as claimed in claim 1,
(d) forming an elongated passage between the stone layers, with the passage defined between the second stone layer and the groove base.

19. The method as claimed in claim 18,
step (b) including the step of securing a translucent segment relative to the stone segments to form the second stone layer, with the translucent segment at least partly defining the passage; and
(e) inserting a powered lamp into the passage, with the second stone layer thereby permitting light radiated by the lamp to pass from the passage into ambient by radiating through the translucent segment.

20. The method as claimed in claim 19,
step (b) including the step of inserting a non-translucent material between abutting edges of the translucent segment and an adjacent one of the stone segments to restrict radiated light from passing from the translucent segment into the adjacent stone segment.

21. The method as claimed in claim 20,
said step of inserting a non-translucent material comprising the step of applying a non-translucent paint to abutting edges the translucent segment and the adjacent stone segment.

22. The method as claimed in claim 20; and
(f) honing the abutting edges of the translucent segment and the adjacent stone segment prior to the step of inserting the non-translucent material, with the honed edges restricting distortion of the radiated light by the second stone layer.

23. The method as claimed in claim 19; and
(f) securing a structural support section within the passage, with the support section receiving the powered lamp,
said support section presenting an opening adjacent the translucent material to permit radiated light to pass from the passage into ambient.

24. The method as claimed in claim 1;
(d) cutting a plurality of holes into the second stone layer prior to step (c); and
(e) cutting a plurality of holes into the first stone layer,
step (c) including the step of aligning corresponding holes in the first and second stone layers, with the aligned holes each cooperatively defining a passage.

25. The method as claimed in claim 24,
step (b) including the step of securing a translucent segment with the stone segments to form the second stone layer, with the translucent segment at least partly defining at least one of the passages; and
(f) inserting a powered lamp into the at least one passage, with the second stone layer thereby permitting light radiated by the lamp to pass from the at least one passage into ambient by radiating through the translucent segment.

26. The method as claimed in claim 1; and
(d) cutting multiple holes into corresponding stone segments prior to step (b), with the stone segments cooperatively presenting a plurality of pockets along the second stone layer,
step (b) including the step of inserting adhesive into each of the pockets to adhere the stone segments to one another.

27. The method as claimed in claim 1; and
(d) machining the layers at the same time to remove part of the margin and thereby form a longitudinally extending finished layered edge surface.

\* \* \* \* \*